United States Patent
Toraichi et al.

(10) Patent No.: US 8,331,720 B2
(45) Date of Patent: Dec. 11, 2012

(54) IMAGE PROCESSING DEVICE, METHOD, AND PROGRAM

(75) Inventors: Kazuo Toraichi, Tsukuba (JP); Jia Lee, Tsukuba (JP); Yasuhiro Ohmiya, Tsukuba (JP)

(73) Assignee: Japan Science and Technology Agency, Kawaguchi-shi, Saitama (JP)

( * ) Notice: Subject to any disclaimer, the term of this patent is extended or adjusted under 35 U.S.C. 154(b) by 388 days.

(21) Appl. No.: 12/673,504

(22) PCT Filed: Aug. 11, 2008

(86) PCT No.: PCT/JP2008/064434
§ 371 (c)(1),
(2), (4) Date: Feb. 14, 2010

(87) PCT Pub. No.: WO2009/022690
PCT Pub. Date: Feb. 19, 2009

(65) Prior Publication Data
US 2011/0199394 A1    Aug. 18, 2011

(30) Foreign Application Priority Data

Aug. 15, 2007  (JP) ................. 2007-211859
Aug. 15, 2007  (JP) ................. 2007-211878

(51) Int. Cl.
*G06K 9/40* (2006.01)
(52) U.S. Cl. ........ 382/266; 382/269; 382/298; 382/299; 382/300
(58) Field of Classification Search ........... 382/298–301
See application file for complete search history.

(56) References Cited

U.S. PATENT DOCUMENTS

| 6,760,489 B1* | 7/2004 | Kuwata ............... 382/300 |
| 2002/0028028 A1 | 3/2002 | Michel | |
| 2003/0007702 A1* | 1/2003 | Aoyama et al. .......... 382/300 |
| 2008/0107357 A1* | 5/2008 | Saito ................... 382/300 |

FOREIGN PATENT DOCUMENTS

| EP | 1591955 A2 | 11/2005 |
| EP | 1816602 A1 | 2/2007 |
| JP | 11-85983 | 3/1993 |
| JP | 10-155128 | 6/1998 |
| JP | 11-175710 | 7/1999 |
| JP | 2001-84244 | 3/2001 |

(Continued)

OTHER PUBLICATIONS

Parker at al, Comparison of Interpolating Methods for Image Resampling, IEEE 1983.*

*Primary Examiner* — Chan S Park
*Assistant Examiner* — Mark Roz
(74) *Attorney, Agent, or Firm* — patenttm.us

(57) ABSTRACT

It is possible to provide an image processing device, a method, and a program which can prevent image degradation which occurs when modifying the image magnification. The image processing device includes: an image input unit (10) which performs an image input; an edge direction calculation unit (24) which detects the edge direction contained in an image inputted by the image input unit (10); and an interpolation position decision unit (26), an interpolation object pixel decision unit (28), a first direction interpolation unit (30), and a second direction interpolation unit (32) which perform an interpolation process in the edge direction detected by the edge direction calculation unit (24) on the image inputted by the image input unit (10).

15 Claims, 19 Drawing Sheets

FOREIGN PATENT DOCUMENTS

| | | |
|---|---|---|
| JP | 2001-160139 | 6/2001 |
| JP | 2003-8884 | 1/2003 |
| JP | 2004-194168 | 7/2004 |
| JP | 2004-194168 A | 7/2004 |
| JP | 2005-312014 | 11/2005 |
| JP | 2006-54899 | 2/2006 |
| JP | 2006-222965 | 8/2008 |

* cited by examiner

F I G. 6
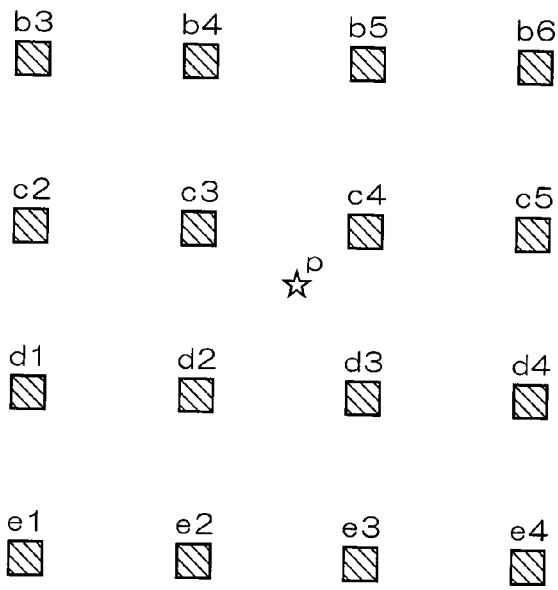
F I G. 7
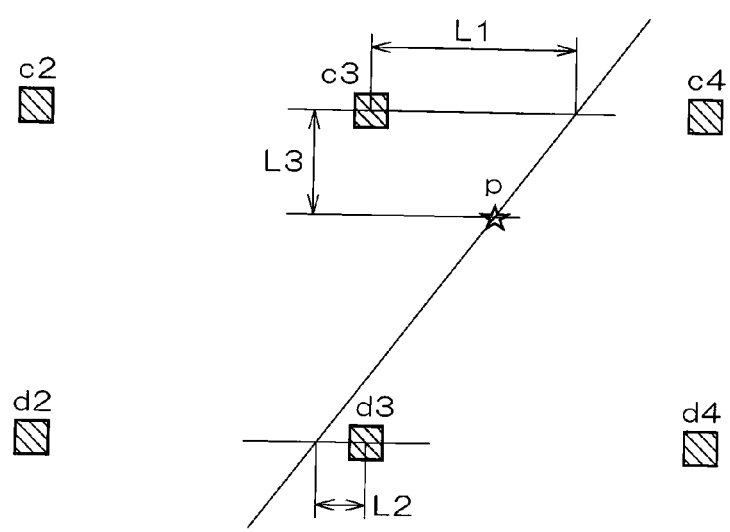

IMAGE PROCESSING DEVICE, METHOD, AND PROGRAM

TECHNICAL FIELD

The present invention relates to an image processing device, method, and program for performing resolution conversion for an input image.

BACKGROUND ART

Conventionally, there is known a method of performing, in performing an interpolation process for an image using a bi-cubic method, adjustment of an interpolation coefficient near an edge of the image and a change of a sampling interval and sequentially performing interpolation in the horizontal direction and the vertical direction (see, for example, Patent Document 1). Patent Document 1: Japanese Patent Application Laid-Open No. 2006-54899 (pages 8 to 19, FIGS. 1 to 15).

DISCLOSURE OF THE INVENTION

Problems to be Solved by the Invention

Incidentally, in the related art described in Patent Document 1, although the adjustment of the interpolation coefficient is performed near the edge, basically, interpolation along an edge direction is not performed. Therefore, there is a problem in that jaggy or the like occurs and an image quality is degraded when the resolution of the image is converted. In particular, when the bi-cubic method is used, the interpolation process is performed along the vertical direction after the interpolation process is performed along the horizontal direction using a one-variable interpolation function. Therefore, values of pixels located in oblique directions with respect to an interpolation position are not directly reflected and the occurrence of the jaggy has to be allowed to some extent.

In such a case, it is convenient if a section where the jaggy or the like occurs can be partially modified. However, in the past, for the modification or repairing of the image, an operator needs to change pixel values tracing a portion to be modified. Therefore, since hand shake or the like also affects the modification, there is a problem in that accuracy is low and the modification takes time.

The present invention has been devised in view of such a point and it is an object of the present invention to provide an image processing device, method, and program which can prevent degradation of an image quality which occurs when modifying the magnification an image. It is another object of the present invention to provide an image processing device, method, and computer program which can reduce time required for modification of an image and improve accuracy of the modification.

Means for Solving the Problems

In order to solve the problems, an image processing device according to the present invention includes: an image input unit which performs input of an image; an edge direction detection unit which detects a direction of an edge of light and shade contained in the image inputted by the image input unit; and a first interpolation process unit which sets, as a first interpolation axis, a direction of the edge detected by the edge direction detection unit with respect to the input image inputted by the image input unit and performs an interpolation process for performing expansion/reduction of the input image along the first interpolation axis.

An image processing method according to the present invention includes: an image inputting step of performing input of an image; an edge direction detecting step of detecting a direction of an edge of light and shade contained in the image input in the image inputting step; and a first interpolation process step of setting, as a first interpolation axis, a direction of the edge detected in the edge direction detecting step with respect to the input image input in the image inputting step and performing an interpolation process for performing expansion/reduction of the input image along the first interpolation axis.

An image processing program according to the present invention causes a computer to function as: an image input unit which performs input of an image; an edge direction detection unit which detects a direction of an edge of light and shade contained in the image inputted by the image input unit; and a first interpolation process unit which sets, as a first interpolation axis, a direction of the edge detected by the edge direction detection unit with respect to the input image inputted by the image input unit and performs an interpolation process for performing expansion/reduction of the input image along the first interpolation axis.

Since a direction of an edge contained in an image is detected and the interpolation process is performed along the direction, it is possible to perform the interpolation process on which the influence of pixels present in the direction of the edge with respect to an interpolation position is directly reflected and prevent degradation of an image quality which occurs when modifying the magnification of the image.

The edge direction detection unit detects a direction indicated by a pointing device on the input image and sets the direction as the direction of the edge. Alternatively, in the edge direction detecting step, a direction indicated by the pointing device on the input image is detected and the direction is set as the direction of the edge. This makes it possible to modify the image simply by indicating the direction of the edge with the pointing device. Therefore, it is possible to reduce time required for the modification of the image. Moreover, since a user can check and indicate the direction of the edge, it is possible to improve accuracy of the modification.

It is desirable that the image processing device further includes a magnification specification unit which designates the magnification of expansion/reduction for the image inputted by the image input unit, and the first interpolation process unit includes: a first interpolation position decision unit which decides an interpolation position corresponding to the magnification designated by the magnification specification unit; and a first interpolation object pixel decision unit which extracts, as interpolation object pixels, n×n (n is an even number equal to or larger than four) pixels arranged around the interpolation position and along the direction of the edge detected by the edge direction detection unit.

Alternatively, it is desirable that the image processing method further includes a magnification specifying step of designating the magnification of expansion/reduction for the image input in the image inputting step, and the first interpolation process step includes: a first interpolation position deciding step of deciding an interpolation position corresponding to the magnification designated in the magnification specifying step; and a first interpolation object pixel deciding step of extracting, as interpolation object pixels, n×n (n is an even number equal to or larger than four) pixels arranged around the interpolation position and along the direction of the edge detected in the edge direction detecting step. This makes it possible decide a necessary interpolation position according to the designated magnification.

It is desirable that the image inputted by the image input unit includes plural pixels arranged along the horizontal axis and the vertical axis orthogonal to each other, and the edge direction detection unit detects the direction of the edge on the basis of pixel values of four pixels surrounding the interpolation position. Alternatively, it is desirable that the image input in the image inputting step includes plural pixels arranged along the horizontal axis and the vertical axis orthogonal to each other, and, in the edge direction detecting step, the direction of the edge is detected on the basis of pixel values of four pixels surrounding the interpolation position. This makes it possible to reduce the number of pixels necessary for the edge direction detection and reduce an operation amount.

It is desirable that the edge direction detection unit calculates, on the basis of the pixel values of the four pixels surrounding the interpolation position, a density gradient of an image corresponding to the four pixels and estimates a direction perpendicular to the density gradient as the direction of the edge. Alternatively, it is desirable that, in the edge direction detecting step, a density gradient of an image corresponding to the four pixels is calculated on the basis of the pixel values of the four pixels surrounding the interpolation position and a direction perpendicular to the density gradient is estimated as the direction of the edge. When an edge is present, since a light and shade gradient occurs across the edge, it is possible to surely learn a direction of the edge by using the light and shade gradient.

It is desirable that a first interpolation object pixel decision unit sets the first interpolation axis having the direction of the edge detected by the edge direction detection unit and extracts, as the interpolation object pixels, n pixels located in a predetermined range across the first interpolation axis. Alternatively, it is desirable that, in the first interpolation object pixel deciding step, the first interpolation axis having the direction of the edge detected in the edge direction detecting step is set and n pixels located in a predetermined range across the first interpolation axis are extracted as the interpolation object pixel. It is desirable that the first interpolation axis has a linear shape or a nonlinear shape which coincides with the direction of the edge.

This makes it possible to reflect the pixel values of the pixels arranged along the direction of the edge on the interpolation process for calculating a pixel value of the interpolation position and obtain an image smooth along the edge direction and without occurrence of jaggy.

It is desirable that one of the horizontal axis and the vertical axis is used as a second interpolation axis, and the first interpolation process unit calculates pixel values in imaginary plural interpolation positions by performing the interpolation process along one interpolation axis of the first and second interpolation axes and calculates, using pixel values corresponding to n interpolation positions obtained by the interpolation process, an interpolation value corresponding to the interpolation position, which is decided by the first interpolation position decision unit, along the other interpolation axis of the first and second interpolation axis. Alternatively, it is desirable that one of the horizontal axis and the vertical axis is used as a second interpolation axis, and, in the first interpolation process step, pixel values in imaginary plural interpolation positions are calculated by performing the interpolation process along one interpolation axis of the first and second interpolation axes and an interpolation value corresponding to the interpolation position, which is decided by the first interpolation position decision unit, is calculated along the other interpolation axis of the first and second interpolation axis by using pixel values corresponding to n interpolation positions obtained by the interpolation process. It is possible to separately perform the interpolation process for the first and second interpolation axes to calculate a final interpolation value and realize simplification of the process.

It is desirable that the first interpolation object pixel decision unit decides on the basis of the direction of the edge detected by the edge detection unit which of the horizontal axis and the vertical axis is used as the second interpolation axis. Specifically, it is desirable that the first interpolation object pixel decision unit sets, as the second interpolation axis, the horizontal axis or the vertical axis having an angle equal to or larger than 45 degrees with respect to the first interpolation axis. Alternatively, it is desirable that, in the first interpolation object pixel deciding step, it is decided on the basis of the direction of the edge detected in the edge detecting step which of a horizontal axis and a vertical axis is used as the second interpolation axis. Specifically, it is desirable that, in the first interpolation object pixel deciding step, the horizontal axis or the vertical axis having an angle equal to or larger than 45 degrees with respect to the first interpolation axis is set as the second interpolation axis. It is possible to improve interpolation accuracy by performing the interpolation process along respective two axes nearly perpendicular to each other.

It is desirable that the first interpolation process unit performs the interpolation process after adjusting the pixel positions of the n×n pixels along the second interpolation axis such that the pixels are arranged in a lattice pattern along the first and second interpolation axes. Alternatively, it is desirable that, in the first interpolation process step, the interpolation process is performed after the pixel positions of the n×n pixels are adjusted along the second interpolation axis such that the pixels are arranged in a lattice pattern along the first and second interpolation axes. When the interpolation process is separately applied to the first and second interpolation axes to calculate a final interpolation value, it is possible to realize simplification of the process using an algorithm equivalent to that in the past.

It is desirable that the interpolation process by the first interpolation process unit or the interpolation process in the first interpolation process step is performed by using a sampling function $\phi(t)$ represented by $\phi(t) = -1.75|t|^2 + 1.0 \ (|t| \leq 0.5)$ $1.25|t|^2 - 3.0|t| + 1.75 \ (0.5 < |t| \leq 1.0)$ $0.75|t|^2 - 2.0|t| + 1.25 \ (1.0 < |t| \leq 1.5)$ $-0.25|t|^2 + |t| - 1.0 \ (1.5 < |t| \leq 2.0)$ $0 \ (2.0 < |t|)$ where t represents an interval of adjacent pixels.

It is desirable that the image processing device includes: a display unit which displays, as an image set as a modification object, the image obtained by the interpolation process by the first interpolation process unit; a modification indication unit which indicates, together with a modification direction, a modification location contained in the image displayed by the display unit; and a second interpolation process unit which applies interpolation process along the modification direction indicated by the modification indication unit to a partial image corresponding to the modification location indicated by the modification indication unit.

It is desirable that the image processing method includes: a displaying step of displaying, as an image set as a modification object, the image obtained by the interpolation process in the first interpolation process step; a modification indicating step of indicating, together with a modification direction, a modification location contained in the image displayed in the displaying step; and a second interpolation process step of applying interpolation process along the modification direction indicated in the modification indicating step to a partial image corresponding to the modification location indicated in the modification indicating step.

It is desirable that the image processing program causes the computer to further function as: a display unit which displays, as an image set as a modification object, the image obtained by the interpolation process by the first interpolation process unit; a modification indication unit which indicates, together with a modification direction, a modification location contained in the image displayed by the display unit; and a second interpolation process unit which applies interpolation process along the modification direction indicated by the modification indication unit to a partial image corresponding to the modification location indicated by the modification indication unit.

It is possible to apply, simply by designating a modification location contained in the displayed image and a modification direction, the interpolation process to the modification location according to the modification direction and perform modification of the image. Therefore, it is possible to reduce time required for the modification of the image. By performing the interpolation process along the modification direction, it is possible to directly reflect the influence of pixels present along the modification direction with respect to the interpolation position, perform highly accurate interpolation process, and improve accuracy of the modification.

It is desirable that the second interpolation process unit performs the interpolation process corresponding to the partial image using pixel values of the pixels forming the image inputted by the image input unit. Alternatively, it is desirable that, in the second interpolation process step, the interpolation process corresponding to the partial image is performed by using pixel values of the pixels forming the image input in the image inputting step. This makes it possible to remove the influence of degradation of an image quality due to the interpolation process performed for displaying the image.

It is desirable that the second interpolation process unit includes a second interpolation object pixel decision unit which extracts, as interpolation object pixels, a predetermined number of pixels arranged around the interpolation position and along the modification direction indicated by the modification indication unit. It is desirable that the second interpolation object pixel decision unit sets a third interpolation axis having the modification direction indicated by the modification indication unit and extracts, as the interpolation object pixels, a predetermined number of pixels located in a predetermined range across the third interpolation axis. Alternatively, it is desirable that the second interpolation process step includes a second interpolation object pixel deciding step of extracting, as interpolation object pixels, a predetermined number of pixels arranged around the interpolation position and along the modification direction indicated in the modification indicating step. It is desirable that, in the second interpolation object pixel deciding step, a third interpolation axis having the modification direction indicated in the modification indicating step is set and a predetermined number of pixels located in a predetermined range across the third interpolation axis are extracted as the interpolation object pixels. This makes it possible to reflect pixel values of the pixels arranged along the direction of the modification direction on the interpolation process for calculating a pixel value in the interpolation position and obtain an image smooth along the modification direction and without occurrence of jaggy.

It is desirable that the modification indication unit includes a pointing device (or uses a pointing device) and the indication of the modification direction is performed by moving, on a modification location of an image displayed on a screen by the display unit, the pointing device along an edge contained in the modification location. Alternatively, it is desirable that the modification indicating step is performed by using a pointing device and the indication of the modification direction is performed by moving, on a modification location of an image displayed on a screen in the displaying step, the pointing device along an edge contained in the modification location. This makes it possible to indicate a modification location and a modification direction with simple operation.

It is desirable that the third interpolation axis has a linear shape obtained by approximating a moving locus of the pointing device. This makes it possible to simplify the interpolation process by simplifying a shape indicating the modification direction.

It is desirable that the third interpolation axis has an arcuate shape or a free-form curve shape obtained by approximating a moving locus of the pointing device. This makes it possible to accurately specify the moving locus of the pointing device, perform modification accurately along an edge of the image contained in the modification location, and improve accuracy of the modification.

It is desirable that one of the horizontal axis and the vertical axis is used as a fourth interpolation axis, the second interpolation process unit includes a second interpolation position decision unit which decides an interpolation position corresponding to the magnification designated by the magnification specification unit, and the second interpolation process unit calculates pixel values in imaginary plural interpolation positions by performing the interpolation process along one interpolation axis of the third and fourth interpolation axes and calculates, using the pixel values corresponding to the plural interpolation positions obtained by the interpolation process, an interpolation value corresponding to the interpolation position, which is decided by the second interpolation position decision unit, along the other interpolation axis of the third and fourth interpolation axes. Alternatively, it is desirable that one of the horizontal axis and the vertical axis is used as a fourth interpolation axis, the second interpolation process step includes a second interpolation position deciding step of deciding an interpolation position corresponding to the magnification designated in the magnification specifying step, and, in the second interpolation process step, pixel values in imaginary plural interpolation positions are calculated by performing the interpolation process along one interpolation axis of the third and fourth interpolation axes and an interpolation value corresponding to the interpolation position, which is decided in the second interpolation position deciding step, is calculated along the other interpolation axis of the third and fourth interpolation axes by using the pixel values corresponding to the plural interpolation positions obtained by the interpolation process. This makes it possible to separately perform the interpolation process for each of the third and fourth interpolation axes to calculate a final interpolation value and realize simplification of a process.

It is desirable that the second interpolation object pixel decision unit decides on the basis of the modification direction indicated by the modification indication unit which of the horizontal axis and the vertical axis is used as a fourth interpolation axis. Specifically, it is desirable that the second interpolation object pixel decision unit sets, as the fourth interpolation axis, the horizontal axis or the vertical axis having an angle equal to or larger than 45 degrees with respect to the third interpolation axis. Alternatively, it is desirable that, in the second interpolation object pixel deciding step, it is decided on the basis of the modification direction indicated in the modification indicating step which of a horizontal axis and a vertical axis is used as a fourth interpolation axis. Specifically, it is desirable that, in the second interpolation object pixel deciding step, the horizontal axis or the vertical axis having an angle equal to or larger than 45 degrees with respect to the third interpolation axis is set as the fourth interpolation axis. It is possible to improve interpolation accuracy by performing the interpolation process along each of two axes nearly perpendicular to each other.

It is desirable that the second interpolation process unit performs the interpolation process after adjusting pixel positions of a predetermined number of pixels along the fourth interpolation axis such that the pixels are arranged in a lattice pattern along the third and fourth interpolation axes. Alternatively, it is desirable that, in the second interpolation process step, the interpolation process is performed after pixel positions of a predetermined number of pixels are adjusted along the fourth interpolation axis such that the pixels are arranged in a lattice pattern along the third and fourth interpolation axes. When the interpolation process is separately applied to the third and fourth interpolation axes to calculate a final interpolation value, it is possible to realize simplification of the process using an algorithm equivalent to that in the past.

It is desirable that the interpolation process by the second interpolation process unit or the interpolation process in the second interpolation process step is performed by using a sampling function $\phi(t)$ represented by $$\phi(t) = -1.75|t|^2 + 1.0 \ (|t| \leq 0.5)$$

$$1.25|t|^2 - 3.0|t| + 1.75 \ (0.5 < |t| \leq 1.0)$$

$$0.75|t|^2 - 2.0|t| + 1.25 \ (1.0 < |t| \leq 1.5)$$

$$-0.25|t|^2 + |t| - 1.0 \ (1.5 < |t| \leq 2.0)$$

$$0 \ (2.0 < |t|)$$

where t represents an interval of adjacent pixels.

BRIEF DESCRIPTION OF THE DRAWINGS

FIG. 6 is a diagram showing an overview of pixel position adjustment performed prior to interpolation process along a first direction;

FIG. 7 is a diagram of an overview of a method of calculating an interpolation pixel p when performing the pixel position adjustment;

Figure 1:
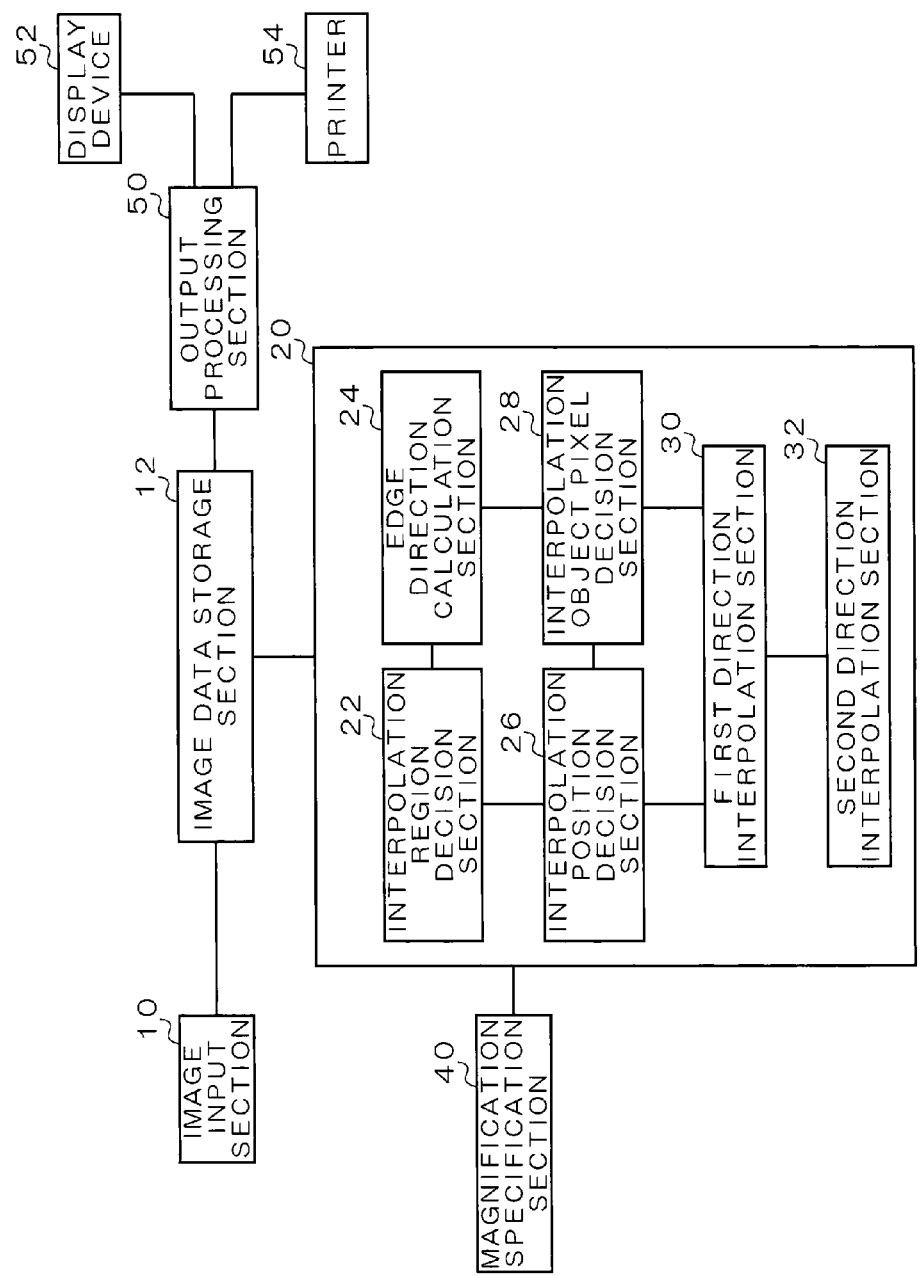
FIG. 1 is a diagram showing the configuration of an image processing device according to a first embodiment.

DESCRIPTION OF SYMBOLS 10 image input section
12 image data storage section
20, 20A interpolation process section
22 interpolation region decision section
24 edge direction detection section
26 interpolation position decision section
28 interpolation object pixel decision section
30 first direction interpolation section
32 second direction interpolation section
34 modification process section
40 magnification specification section
50 output processing section
52 display device
54 printer

BEST MODE FOR CARRYING OUT THE INVENTION

An image processing device according to an embodiment to which the present invention is applied is explained in detail below with reference to the drawings.

First Embodiment

FIG. 1 is a diagram showing the configuration of an image processing device according to a first embodiment. As shown in FIG. 1, the image processing device according to the first embodiment includes an image input section 10, an image data storage section 12, an interpolation process section 20, a magnification specification section 40, an output processing section 50, a display device 52, and a printer 54.

The image input section 10 is a section for capturing image data with predetermined resolution. For example, a scanner which optically reads, at predetermined resolution, an image drawn on a paper document can be used as the image input section 10. Alternatively, when image data recorded on removable storage media such as a CD and a DVD is captured, drive devices (reading devices) for these storage media can be used as the image input section 10. When image data recorded on a semiconductor memory and a hard disk device is captured, input and output interfaces for connecting the semiconductor memory and the hard disk device can be used as the image input section 10. When image data is captured by communication performed via the Internet, other networks, a telephone line, or the like, a communication device corresponding to a type of the line or the like can be used as the image input section 10. An image corresponding to the image data captured by the image input section 10 in this way includes plural pixels arranged along a horizontal axis (an x axis) and a vertical axis (a y axis) orthogonal to each other.

The image data storage section 12 stores the image data captured by the image input section 10, image data after interpolation finally obtained by the interpolation process section 20, and intermediate data necessary for obtaining this image data after interpolation.

The interpolation process section 20 performs interpolation process necessary for expansion or reduction of the image on the basis of the image data and the intermediate data captured by the image input section 10 and stored in the image data storage section 12. In this specification, the image data captured by the image input section 10 and stored in the image data storage section 12 is referred to as "input image data" and the image corresponding to the input image data is referred to as "input image". A value (a shading value or a luminance value or, in the case of color image, values of RGB, etc.) of each of the plural pixels forming the image is referred to as "pixel value" and a set of pixel values of the plural pixels forming the image is referred to as "image data". The image data after the magnification thereof is changed by the interpolation process by the interpolation process section 20 is stored in the image data storage section 12. The interpolation process section 20 includes an interpolation region decision section 22, an edge direction detection section 24, an interpolation position decision section 26, an interpolation object pixel decision section 28, a first direction interpolation section 30, and a second direction interpolation section 32.

The magnification specification section 40 designates expansion/reduction magnification of an image. For example, it is possible to directly input a value of magnification by using a keyboard as the magnification specification section 40 and operating a ten key and the like of the keyboard. Alternatively, it is also possible to input arbitrary magnification or select a desired value out of plural magnifications prepared in advance by using a mouse as the magnification specification section 40 and pointing a predetermined place of a magnification designation screen displayed on the display device 52.

The output processing section 50 performs a process necessary for reading out image data after subjected to expansion/reduction process by the interpolation process section 20 from the image data storage section 12 and displaying an expanded/reduced image on a screen of the display device 25, or printing the image with the printer 54. Specifically, the output processing section 50 has a function of converting the image data read out from the image data storage section 12 into a signal of a format necessary for display (e.g., an NTSC signal or a GBR signal) by the display device 52 and inputting the signal to the display device 52 and a function of converting the image data into a signal of a format necessary for printing by the printer 54.

The image input section 10 corresponds to the image input unit, the edge direction detection section 24 corresponds to the edge direction detection unit, the interpolation position decision section 26, the interpolation object pixel decision section 28, the first direction interpolation section 30, and the second direction interpolation section 32 correspond to the first interpolation process unit, the magnification specification section 40 corresponds to the magnification specification unit, the interpolation position decision section 26 corresponds to the first interpolation position decision unit, and the interpolation object pixel decision section 28 corresponds to the first interpolation object pixel decision unit. The operation performed by the image input section 10 corresponds to the image inputting step, the operation performed by the edge direction detection section 24 corresponds to the edge direction detecting step, the operation performed by the interpolation position decision section 26, the interpolation object pixel decision section 28, the first direction interpolation section 30, and the second direction interpolation section 32 corresponds to the first interpolation process step, the operation performed by the magnification specification section 40 corresponds to the magnification specifying step, the operation performed by the interpolation position decision section 26 corresponds to the first interpolation position deciding step, and the operation performed by the interpolation object pixel decision section 28 corresponds to the first interpolation object pixel deciding step.

The image processing device can be realized by the configuration of a computer including a CPU, a ROM, and a RAM. In this case, the image data storage section 12 can be configured by a hard disk device or a semiconductor memory. The interpolation process section 20 can be realized by executing, in the CPU, a predetermined image processing program stored in the ROM, the RAM, the hard disk device, or the like.

Figure 2:
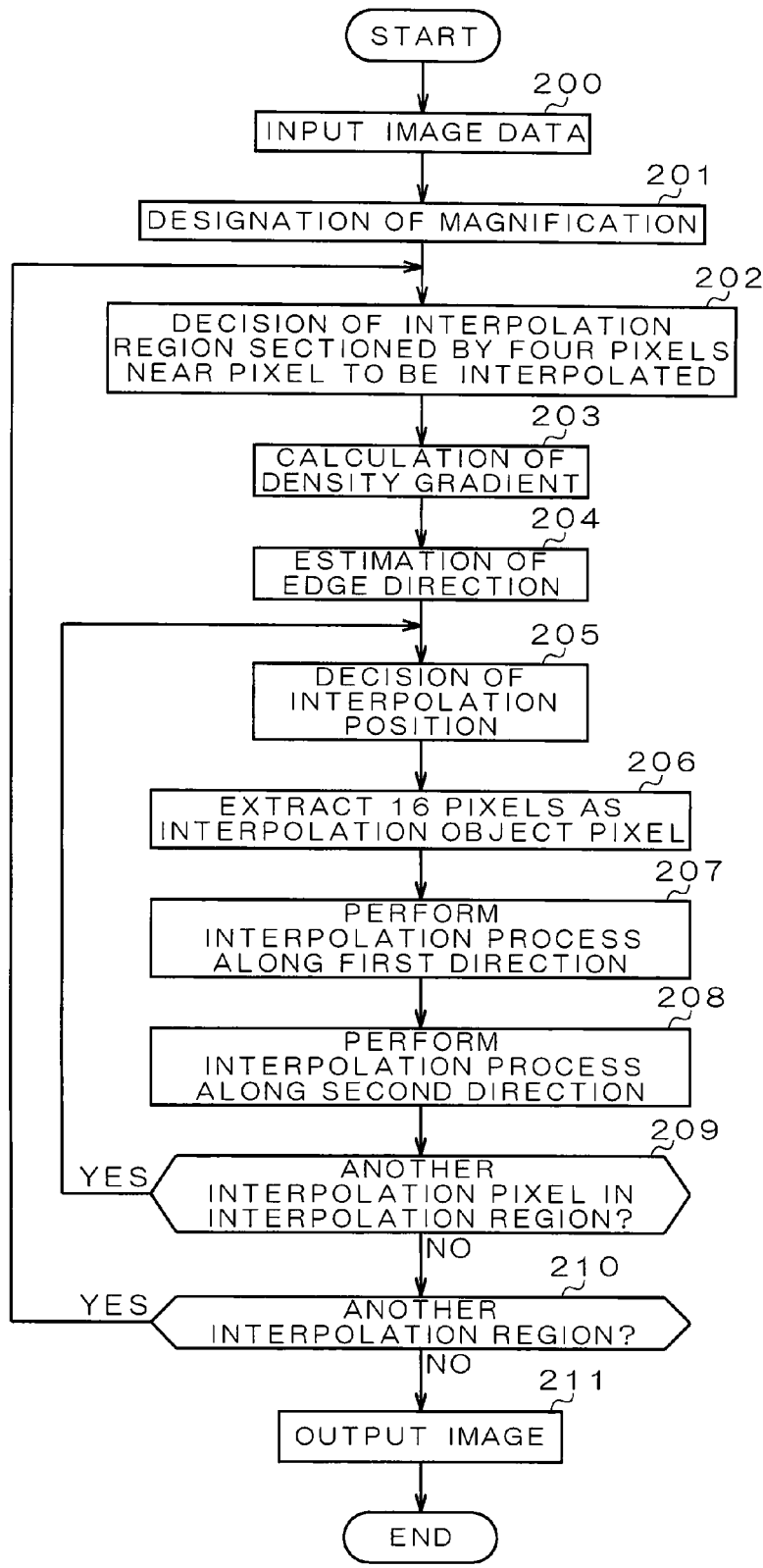
FIG. 2 is a flowchart showing an operation procedure of interpolation process by the image processing device according to the embodiment.

The image processing device according to this embodiment has such a configuration. Specific content of an interpolation process by the image processing device is explained. FIG. 2 is a flowchart showing an operation procedure of the interpolation process by the image forming device according to this embodiment.

After input of image data is performed by using the image input section 10 (step 200), designation of magnification using the magnification specification section 40 is performed (step 201). Next, the interpolation region decision section 22 extracts 2×2 pixels (four pixels) out of plural pixels forming an input image and decides a region (square) sectioned by these four pixels as an "interpolation region" (step 202).

Next, the edge direction detection section 24 calculates a density gradient of an image corresponding to these four pixels on the basis of pixel values of the four pixels used in deciding the interpolation region (step 203). As explained later, since an interpolation position is set in the inside of the four pixels used in deciding the interpolation region, the density gradient of the image is calculated on the basis of the pixel values of the four pixels surrounding the interpolation position. The edge direction detection section 24 estimates a direction perpendicular to the density gradient as an edge direction (a direction of a contour line) of the image (step 204).

Figure 3:
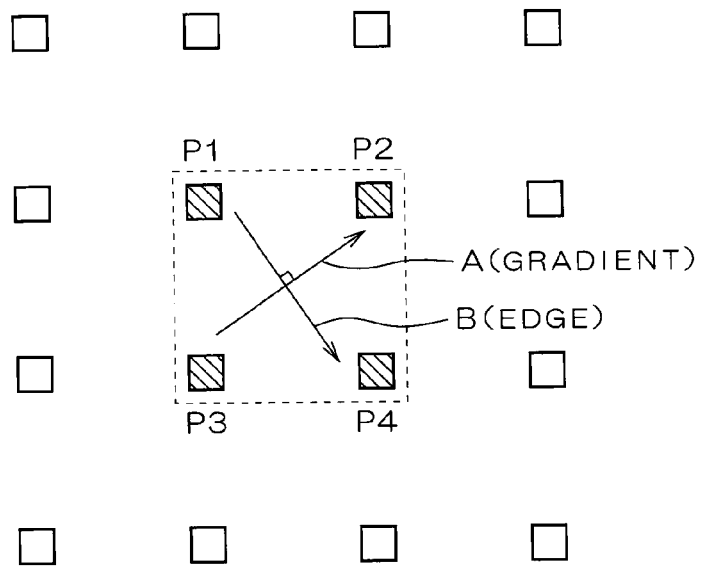
FIG. 3 is a diagram showing an overview of density gradient calculation and edge direction estimation.

FIG. 3 is a diagram showing an overview of the density gradient calculation and the edge direction estimation. In FIG. 3, P1, P2, P3, and P4 indicate the four pixels which section the interpolation region decided in step 202. An arrow A indicates a density gradient and an arrow B indicates an edge direction orthogonal to the density gradient.

When a plane approximation formula is represented as ax+by+c=P and density in a pixel position (xi, yi) is represented as Pk, the following equation holds:

$$X = \begin{bmatrix} x_0 & y_0 & 1 \\ x_1 & y_1 & 1 \\ x_0 & y_0 & 1 \\ x_1 & y_1 & 1 \end{bmatrix}, P = \begin{bmatrix} P1 \\ P2 \\ P3 \\ P4 \end{bmatrix}, M = \begin{bmatrix} a \\ b \\ c \end{bmatrix} \quad \text{[Expression 1]}$$

$$XM = P$$

$$M = (X^T X)^{-1} X^T P$$

The edge direction detection section 24 calculates a density gradient r=−a/b from the equation and estimates a direction R=b/a perpendicular to the density gradient as an edge direction.

Figure 4:
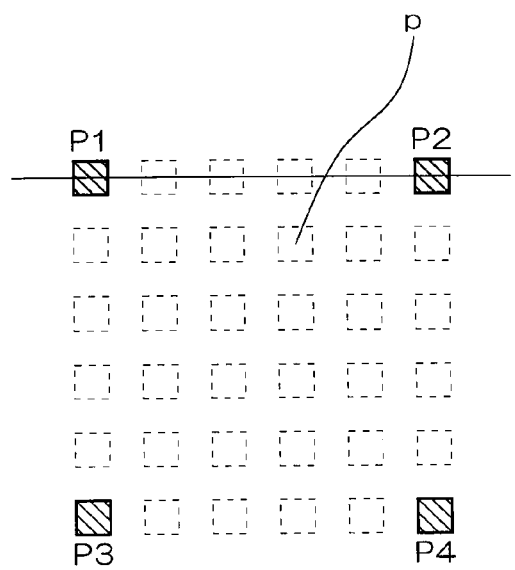
FIG. 4 is a diagram showing an overview of interpolation position decision.

Next, the interpolation position decision section 26 decides an interpolation position in the interpolation region, i.e., a position where interpolation pixels are generated in the interpolation region (step 205). FIG. 4 is a diagram showing an overview of the decision of the interpolation position. For example, a case in which magnification "5" is designated in step 201, i.e., the input image is expanded to five times its original size is shown. In this case, as indicated by a square of a dotted line in FIG. 4, four interpolation pixels only have to be generated at equal intervals between two pixels adjacent to each other. For example, a position of an interpolation pixel indicated by p (an interpolation position) is decided in step 205.

Next, the interpolation object pixel decision section 28 extracts, on the basis of the edge direction estimated by the edge direction detection section 24, n×n pixels necessary for calculating pixel values of the interpolation pixel as "interpolation object pixels" (step 206). n is an even number equal to or larger than 2. Specifically, if a sampling function to be used is decided, a value of n is also decided. However, the value of n is desirably equal to or larger than 4 to perform a smooth interpolation process. In this embodiment, n is set to 4. A specific example of the sampling function is explained later.

Figure 5:
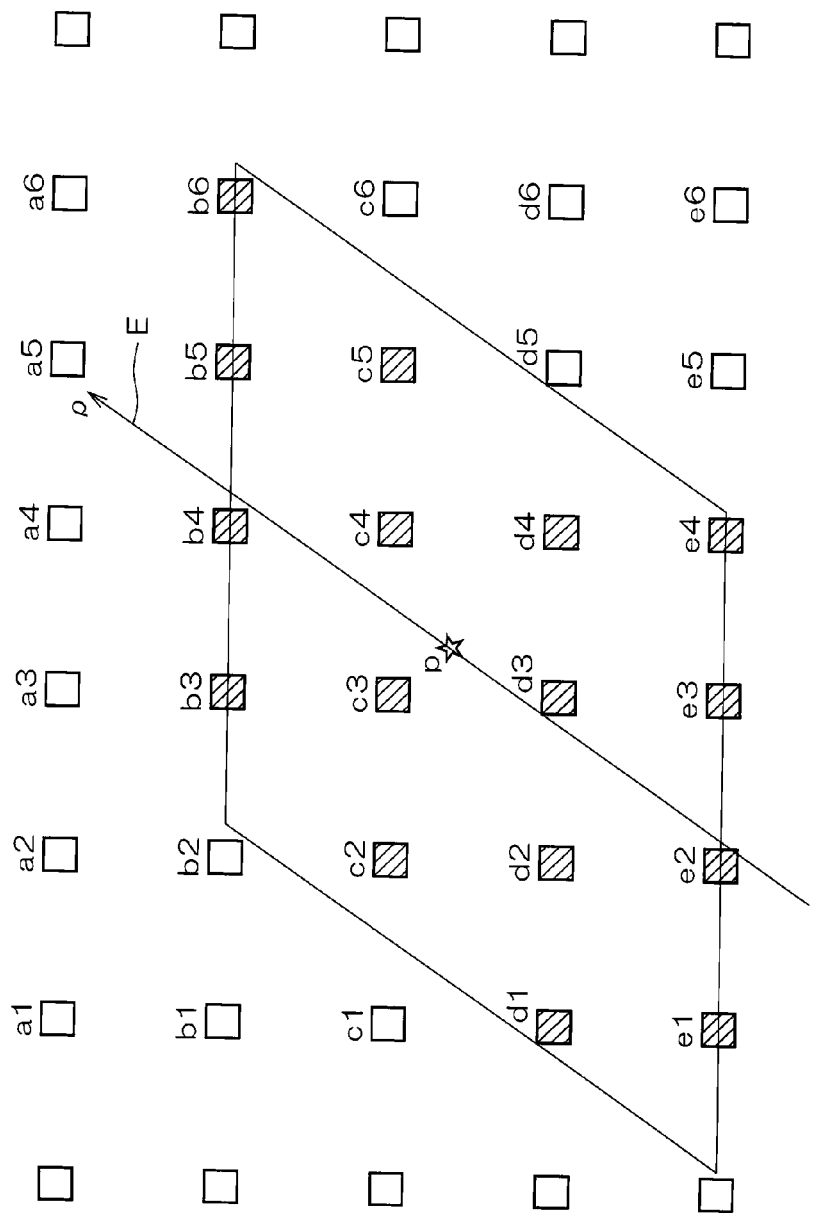
FIG. 5 is a diagram showing an overview of interpolation object pixel extraction.

FIG. 5 is a diagram showing an overview of the interpolation object pixel extraction. In FIG. 5, a1 to a6, b1 to b6, c1 to c6, d1 to d6, and e1 to e6 respectively indicate the pixels forming the input image. E indicates the edge direction estimated in step 204. In an interpolation process conventionally performed, in the case of n=4, sixteen pixels in total (b2 to b5, c2 to c5, d2 to d5, and e2 to e5), each two pixels of which are arranged above and below and on the left and right in each of the horizontal (an x axis direction) and the vertical (a y axis direction) (the horizontal direction is the x axis and the vertical direction is the y axis) across the interpolation pixel p, are extracted as interpolation object pixels. On the other hand, in this embodiment, the edge direction E passing the interpolation pixel p is set as a ρ axis. This ρ axis is used instead of the y axis. The x axis and the ρ axis are respectively set as interpolation axes (the ρ axis corresponds to a first interpolation axis and the x axis corresponds to a second interpolation axis). Each two pixels in left, right, and oblique directions across the interpolation pixel p are extracted as interpolation object pixels along each of these non-orthogonal two interpolation axes. Specifically, the interpolation object pixel decision section 28 extracts sixteen pixels b3 to b6, c2 to c5, d1 to d4, and e1 to e4 as interpolation object pixels.

Next, the first direction interpolation section 30 sets the ρ axis as a first direction and performs an interpolation process along the first direction (step 207). FIG. 6 is a diagram showing an overview of pixel position adjustment performed prior to the interpolation process along the first direction. As shown in FIG. 5, the sixteen interpolation object pixels arranged around the interpolation pixel p are not arranged parallel to the ρ axis when viewed in the ρ axis direction. For example, looking at four pixels b6, c5, d4, and e4 arranged on the most right side among the interpolation object pixels shown in FIG. 5, these four pixels are not parallel to the ρ axis. In this embodiment, the first direction interpolation section 30 performs coordinate conversion as shown in FIG. 6 before performing the interpolation process along the first direction (the ρ axis). Pixel position adjustment is performed such that the sixteen interpolation object pixels are regularly arranged along the ρ axis (in FIG. 6, the vertical direction).

Figure 8:
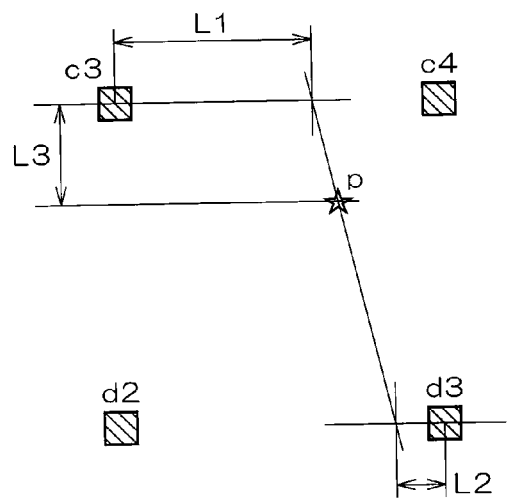
FIG. 8 is a diagram of an overview of a method of calculating the interpolation pixel p when performing the pixel position adjustment.

FIGS. 7 and 8 are diagrams showing an overview of a method of calculating the interpolation pixel p in performing pixel position adjustment. As shown in FIG. 7, a distance in the x axis direction between the interpolation pixel p and the pixel c3 on the upper left is represented as L1, a distance in the y axis direction is represented as L3, and a distance in the x axis direction between the interpolation pixel p and the pixel d3 on the lower left is represented as L2. As shown in FIG. 8, L3 is used as a distance in the ρ axis direction between the interpolation pixel p and the pixel c3 on the upper left after the pixel position adjustment. The position of the pixel d3 arranged on the lower left of the interpolation pixel p before the pixel position adjustment shifts to the lower right. Therefore, the position of the interpolation pixel p also shifts according to this shift.

Figure 9:
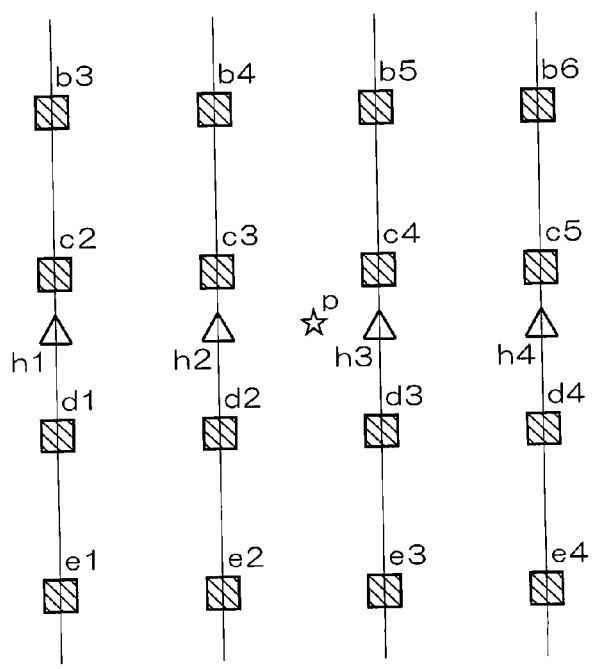
FIG. 9 is a diagram showing an overview of interpolation process along the first direction performed after the pixel position adjustment.
Figure 10:
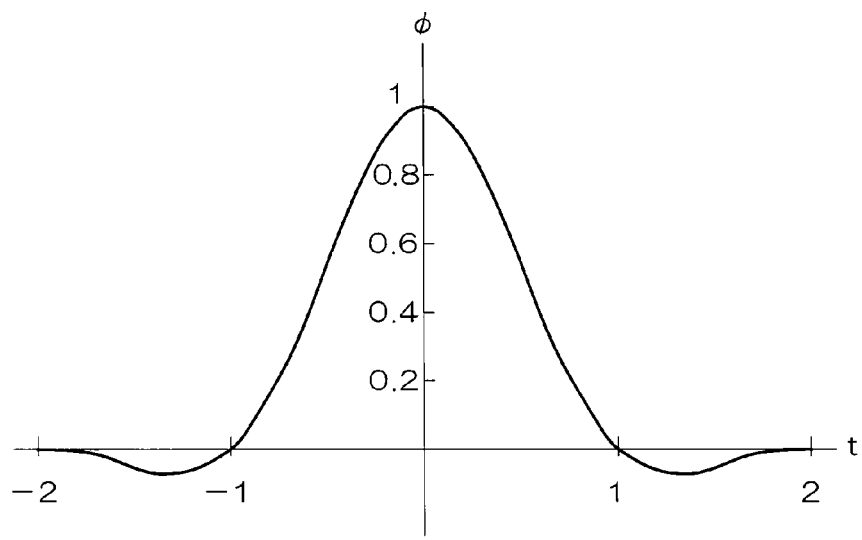
FIG. 10 is a diagram showing a sampling function used for pixel value calculation for an interpolation pixel.

FIG. 9 is a diagram showing an overview of an interpolation process along the first direction performed after the pixel position adjustment. As shown in FIG. 9, by using pixel values of the four pixels arranged along the ρ axis, pixel values of imaginary interpolation pixels h1 to h4 corresponding to positions along the ρ axis same as the interpolation pixel p are calculated by the interpolation process. FIG. 10 is a diagram showing a sampling function used for calculation of a pixel value of an interpolation pixel. This sampling function $\phi(t)$ is a piecewise polynomial indicated by the following equation. A pixel value of an interpolation pixel can be calculated by using pixel values of two pixels on the left and right around an interpolation position (when interpolation along the ρ axis is performed, upper and lower 2 pixels along the ρ axis shown in FIG. 9).

Figure 11:
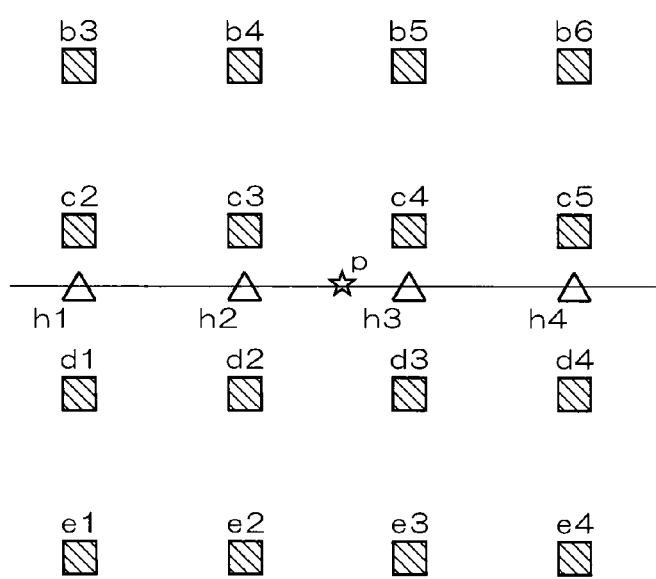
FIG. 11 is a diagram showing an overview of interpolation process along a second direction performed after the interpolation process along the first direction.

$\phi(t) = -1.75|t|^2 + 1.0 \ (|t| \leq 0.5)$ $1.25|t|^2 - 3.0|t| + 1.75 \ (0.5 < |t| \leq 1.0)$ $0.75|t|^2 - 2.0|t| + 1.25 \ (1.0 < |t| \leq 1.5)$ $-0.25|t|^2 + |t| - 1.0 \ (1.5 < |t| \leq 2.0)$ $0 \ (2.0 < |t|)$ Next, the second direction interpolation section 32 sets the x axis as a second direction and performs an interpolation process along the second direction (step 208). FIG. 11 is a diagram showing an overview of the interpolation process along the second direction performed after the interpolation process along the first direction. As shown in FIG. 11, by using pixel values of imaginary interpolation pixels h1 to h4 arranged along the horizontal direction (the x axis direction), a pixel value of a final interpolation pixel p is calculated by the interpolation process.

Next, the interpolation position decision section 26 decides whether another interpolation pixel (an interpolation pixel for which calculation of an interpolation value does not end) is present in the interpolation region (step 209). When another interpolation pixel is present, affirmative decision is made, the process returns to step 205, and the operation for deciding an interpolation position and subsequent operation are repeated. When the calculation of an interpolation value ends for all interpolation pixels in the interpolation region, negative decision is made in the decision in step 209. Next, the interpolation region decision section 22 decides whether another interpolation region for which the interpolation process does not end is present (step 210). When another interpolation region is present, affirmative decision is made, the process returns to step 202, and the operation for deciding an interpolation region and subsequent operation are repeated. When the interpolation process ends for all interpolation regions, negative decision is made in the decision in step 210. When the image is expanded, the entire input image is not always set as a display object or a print object. In such a case, the decision in step 210 may be applied to a part of the image set as the display object or the print object.

After the image data for which the interpolation process ends for all the interpolation regions in this way is stored in the image data storage section 12, the output processing section 50 reads out this image data and displays an image after being expanded at predetermined magnification (e.g., five times) on the screen of the display device 52 or print this image with a printer (step 211).

As explained above, in the image processing device according to this embodiment, by detecting a direction of an edge contained in an image and performing the interpolation process according to the direction, it is possible to perform the interpolation process directly reflecting the influence of pixels present in the direction of the edge with respect to the interpolation position. It is possible to prevent degradation of an image quality which occurs when modifying the magnification of the image. Further, by detecting a direction of an edge on the basis of pixel values of four pixels, it is possible to reduce the number of pixels necessary for edge direction detection and reduce an operation amount. In particular, when an edge is present, since a shading gradient occurs across the edge, it is possible to surely learn a direction of the edge by using the shading gradient.

By setting the ρ axis as the first interpolation axis having the direction of the edge and extracting a predetermined number of pixels located in the predetermined range across the ρ axis as interpolation object pixels, it is possible to reflect pixel values of pixels arranged along the direction of the edge on the interpolation process for calculating a pixel value of the interpolation position. It is possible to obtain an image smooth along the edge direction and without occurrence of jaggy. Further, by separately performing the interpolation process for each of the first and second interpolation axes (the ρ axis and the x axis) to calculate a final interpolation value, it is possible to realize simplification of the process.

By performing the interpolation process after pixel positions of the predetermined number of pixels are adjusted along the x axis to be arranged in a lattice pattern along the ρ axis and the x axis, when the interpolation process is separately performed for each of the ρ axis and the x axis to calculate a final interpolation value, it is possible to realize simplification of the process using an algorithm equivalent to that in the past.

Figure 12:
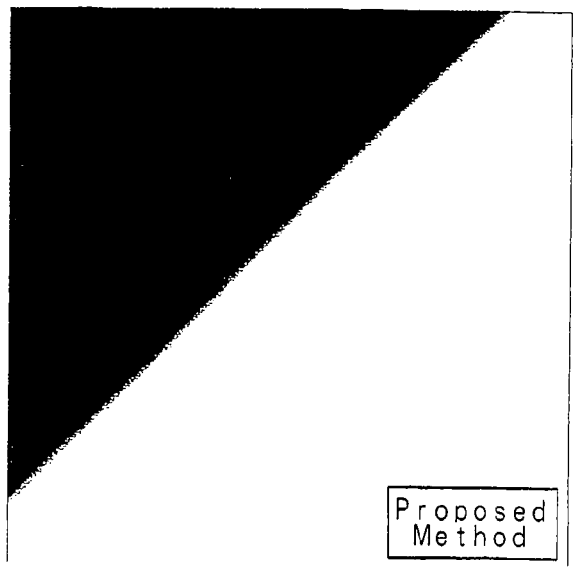
FIG. 12 is a diagram showing an image obtained by the interpolation process by the image processing device according to the embodiment.
Figure 13:
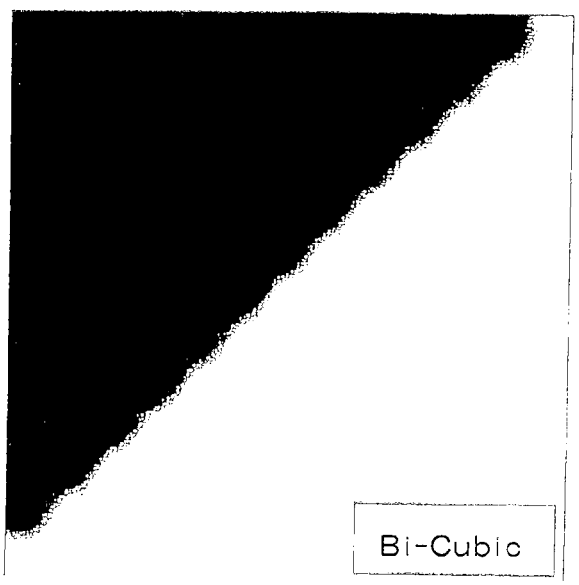
FIG. 13 is an example showing an image obtained by interpolation process performed by using the bi-cubic method.

FIG. 12 is a diagram showing an image obtained by the interpolation process by the image processing device according to this embodiment. FIG. 13 is an example showing, for comparison, an image obtained by the interpolation process using the bi-cubic method. As it is evident from FIG. 12, in this embodiment, it is possible to obtain an expanded image without occurrence of jaggy by performing interpolation process along an edge direction.

In the explanation of this embodiment of the above, the interpolation process in the first direction in step 207 (FIG. 9) is performed along the ρ axis and the interpolation process in the second direction in step 208 (FIG. 11) is performed along the x axis. Conversely, the interpolation process in the first direction may be performed along the x axis and the interpolation process in the second direction may be performed along the ρ axis. This modification can also be applied to other embodiments explained later.

Figure 14:
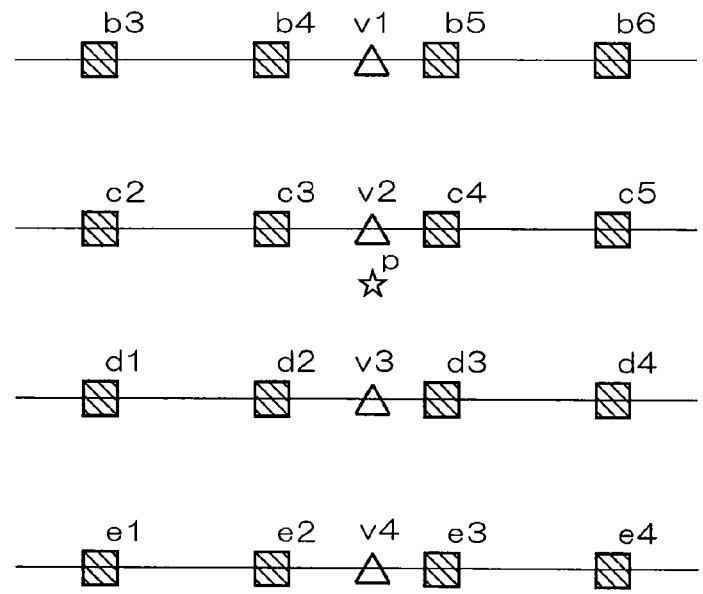
FIG. 14 is a diagram showing an overview of interpolation process along the first direction according to a modification.

FIG. 14 is a diagram showing an overview of the interpolation process along the first direction according to the modification. As shown in FIG. 14, by using pixel values of four pixels arranged along the x axis, pixel values of imaginary interpolation pixels v1 to v4 corresponding to positions along the x axis same as the interpolation pixel p (positions after pixel position adjustment) are calculated by the interpolation process.

Figure 15:
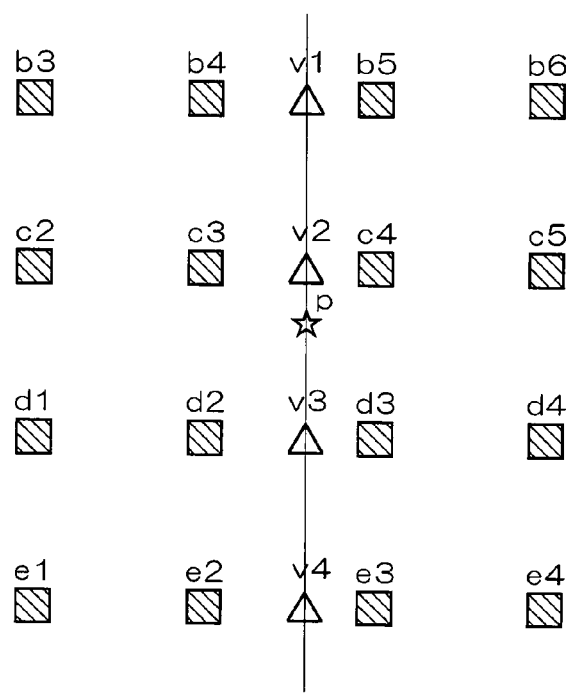
FIG. 15 is a diagram showing an overview of interpolation process along the second direction performed after the interpolation process along the first direction according to the modification.

FIG. 15 is a diagram showing an overview of the interpolation process along the second direction performed after the interpolation process along the first direction according to the modification. As shown in FIG. 15, a pixel value of a final interpolation pixel p is calculated by the interpolation process by using the imaginary interpolation pixels v1 to v4 arranged along the ρ axis direction.

In the explanation of this embodiment of the above, the x axis is fixed and the y axis is replaced with the ρ axis set in the edge direction. However, when an angle between the x axis and the edge direction is smaller than 45 degrees, interpolation accuracy is improved when the y axis is fixed and the x axis is replaced with the ρ axis set in the edge direction.

Figure 16:
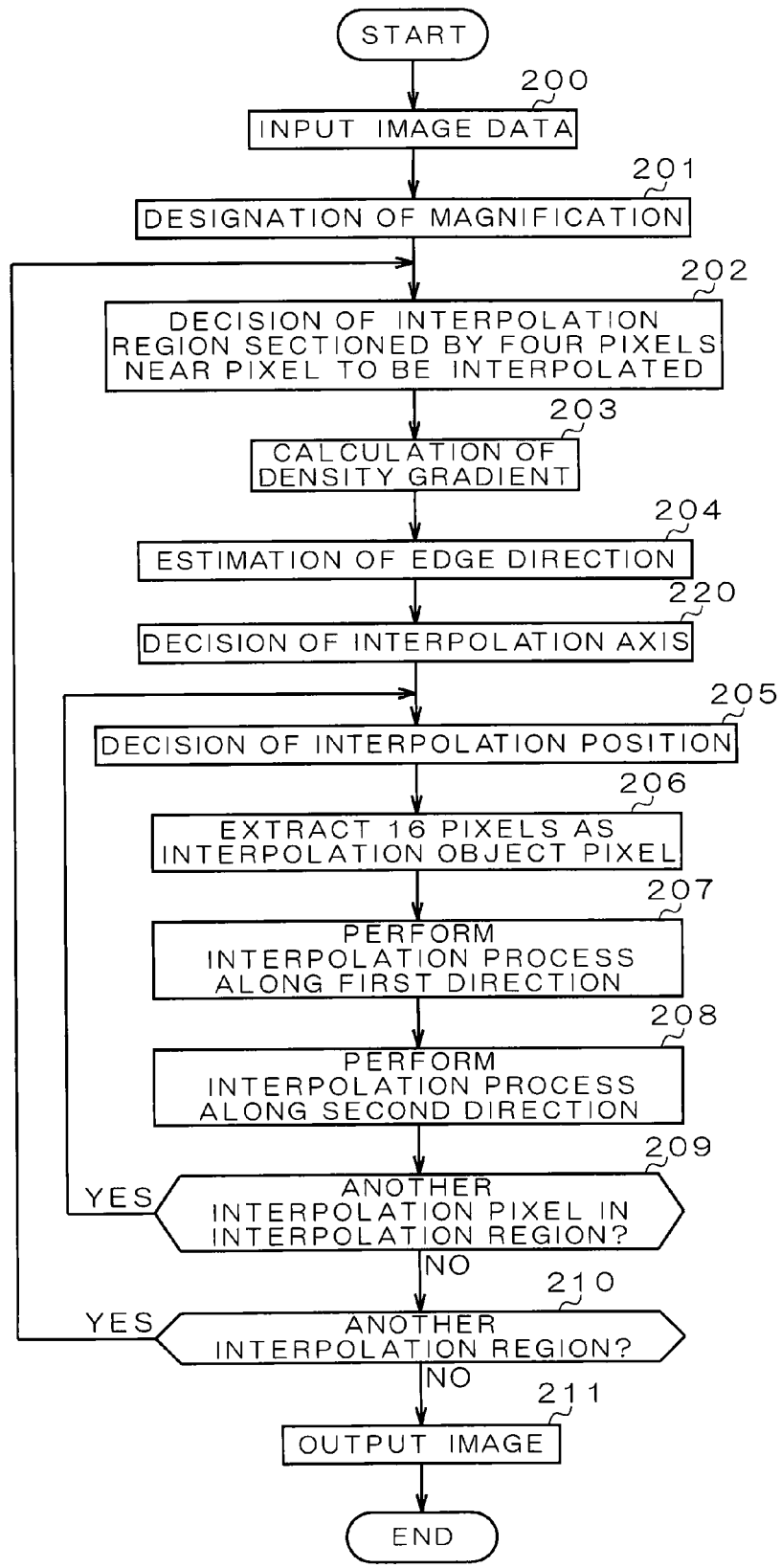
FIG. 16 is a flowchart showing an operation procedure of the interpolation process by the image processing device according to the modification for variably setting an interpolation axis according to an edge direction.

FIG. 16 is a flowchart showing an operation procedure of the interpolation process by the image processing device according to the modification for variably setting an interpolation axis according to an edge direction. Compared with the flowchart shown in FIG. 2, an operation procedure for interpolation axis decision in step 220 is added after step 204. In this step 220, the interpolation object pixel decision section 28 calculates an angle between the x axis and the edge direction E and decides an interpolation axis used in combination with the ρ axis. Specifically, when the angle between the x axis and the edge direction E is equal to or larger than 45 degrees, the x axis and the ρ axis are set as interpolation axes and the series of interpolation process explained with reference to FIG. 2 is carried out. On the other hand, when the angle between the x axis and the edge direction E is smaller than 45 degrees, the y axis and the ρ axis are set as interpolation axes. In this case, in step 206, in FIG. 5, each two pixels are selected above and below in the y axis direction across the ρ axis and sixteen pixels as interpolation objects are extracted. In step 207, the interpolation process in the first direction is performed along the ρ axis and the interpolation process in the second direction in step 208 is performed along the y axis. Alternatively, conversely, the interpolation process in the first direction may be performed along the y axis and the interpolation process in the second direction may be performed along the ρ axis. Instead of calculating an angle between the x axis and the ρ axis, an angle between the y axis and the ρ axis may be calculated to decide an interpolation axis used in combination with the ρ axis.

In this way, the x axis or the y axis having an angle equal to or larger than 45 degrees with respect to the ρ axis is set as the second interpolation axis and the interpolation process is performed along each of two axes nearly perpendicular to each other. Therefore, it is possible to improve interpolation accuracy.

In the explanation of this embodiment, when the sixteen pixels as the interpolation objects are extracted in step 206, a straight line along the edge direction E is set as the ρ axis. However, a nonlinear ρ axis may be set. This modification can also be applied to a second embodiment explained below. For example, a curve represented by any one of functions H1(x, y) to H3(x, y) shown below may be set as the ρ axis.

$$H1(x,y)=(ax^2+bx+c)(dy^2+ey+f)$$

$$H2(x,y)=ax^2+by^2+cx+dy+exy+f$$

$$H3=ax^4+by^4+cx^2y^2+dx^2y+exy^2+fxy+gx+hy+f$$

Figure 17:
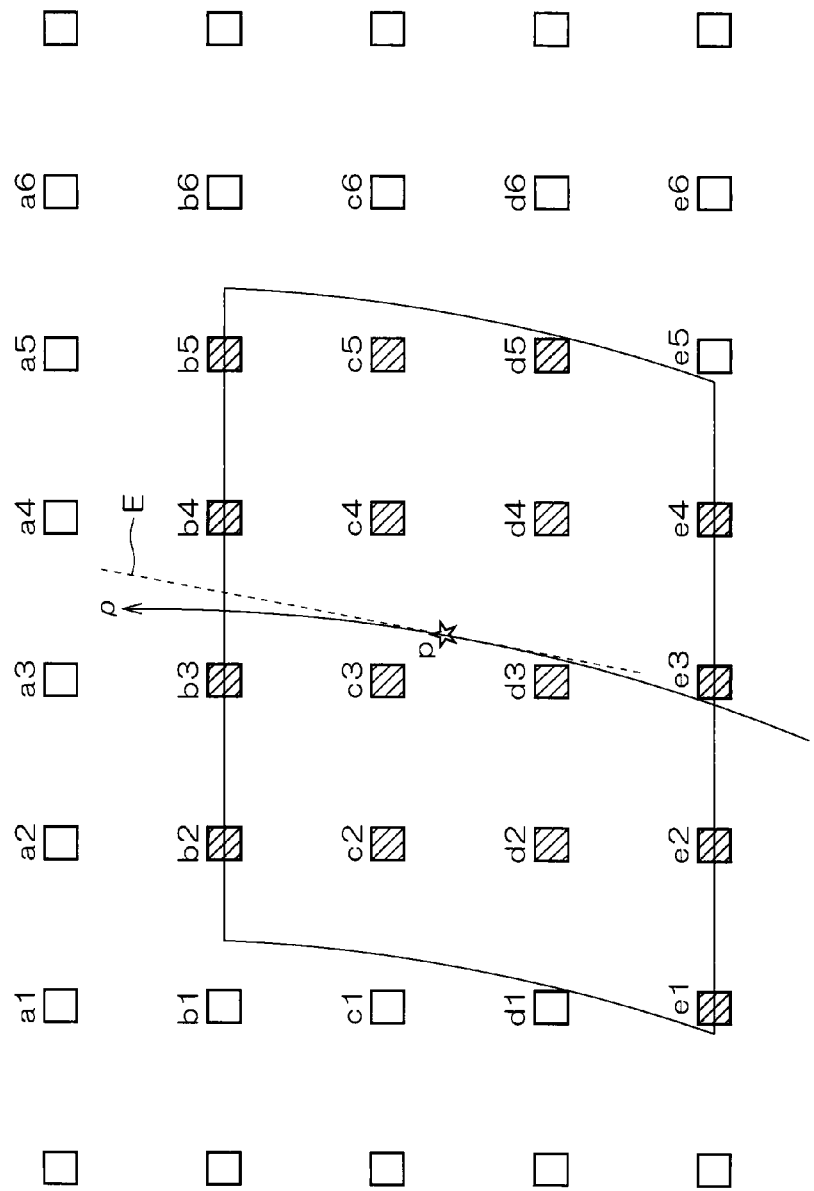
FIG. 17 is a diagram showing an overview of interpolation object pixel extraction in the case in which a nonlinear $\rho$ axis is set.

FIG. 17 is a diagram showing an overview of interpolation object pixel extraction in the case in which the nonlinear ρ axis is set. As shown in FIG. 17, the nonlinear ρ axis is set to be in contact with a straight line along the edge direction in an interpolation position. Sixteen pixels in total (b2 to b5, c2 to c5, d2 to d5, and e1 to e4), each two pixels of which are arranged on the left and right across the ρ axis, are extracted as interpolation object pixels.

Second Embodiment

In the first embodiment explained above, after the n×n interpolation object pixels are extracted along the ρ axis (FIG. 5), the pixel position adjustment for shifting the pixel positions in the x axis direction is performed (FIG. 6). However, the interpolation processes along the first direction and the second direction may be performed without performing the pixel position adjustment.

Figure 18:
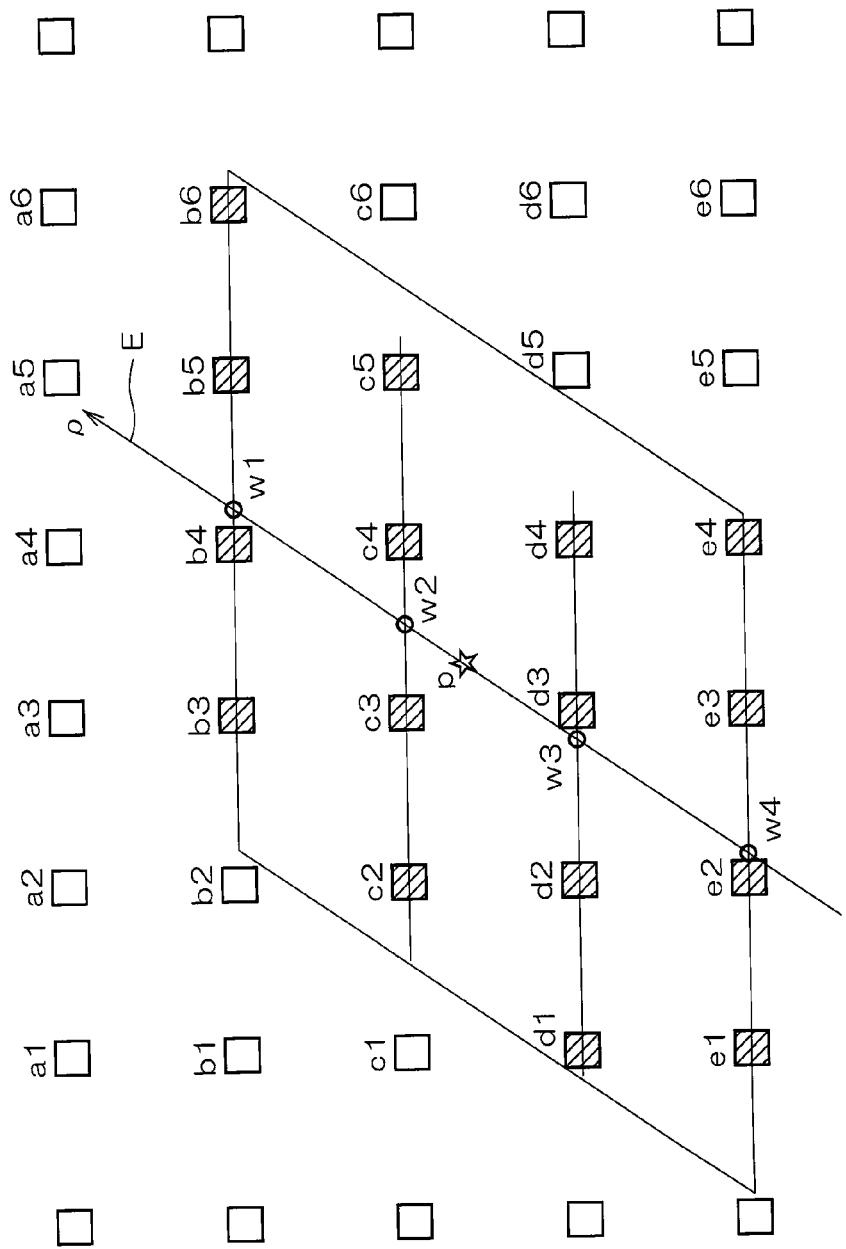
FIG. 18 is a diagram showing an overview of interpolation process according to a second embodiment.

FIG. 18 is a diagram showing an overview of an interpolation process according to a second embodiment. An operation procedure of the entire interpolation process is the same as that shown in FIG. 2. Operation up to the operation for extracting sixteen pixels as interpolation objects in step 206 is performed in the same manner as the first embodiment.

Next, as shown in FIG. 18, the first direction interpolation section 30 calculates, by using pixel values of sets of four pixels arranged along the x axis, according to the interpolation process, pixel values of imaginary interpolation pixels w1 to w4 corresponding to intersections of a straight line in the x axis direction passing these four pixels and a straight line in the edge direction E passing the interpolation pixel p (step 207). The second direction interpolation section 32 calculates, by using the pixel values of the imaginary interpolation pixels w1 to w4 arranged along the ρ axis direction, a pixel value of the final interpolation pixel p according to the interpolation process (step 208). This operation in the second embodiment is the same in an interpolation process in the first direction performed in step 217 in a third embodiment explained later and a second interpolation process performed in step 218.

As explained above, in the image processing device according to this embodiment, by detecting a direction of an edge contained in an image and performing the interpolation process according to the direction, it is possible to perform an interpolation process directly reflecting the influence of pixels present in the direction of the edge with respect to an interpolation position and prevent degradation of an image quality which occurs when modifying the magnification of the image. In particular, by directly using pixel positions along the x axis, it is possible to more accurately reflect the influence of the pixels arranged along the edge direction on the interpolation process.

Third Embodiment

Figure 19:
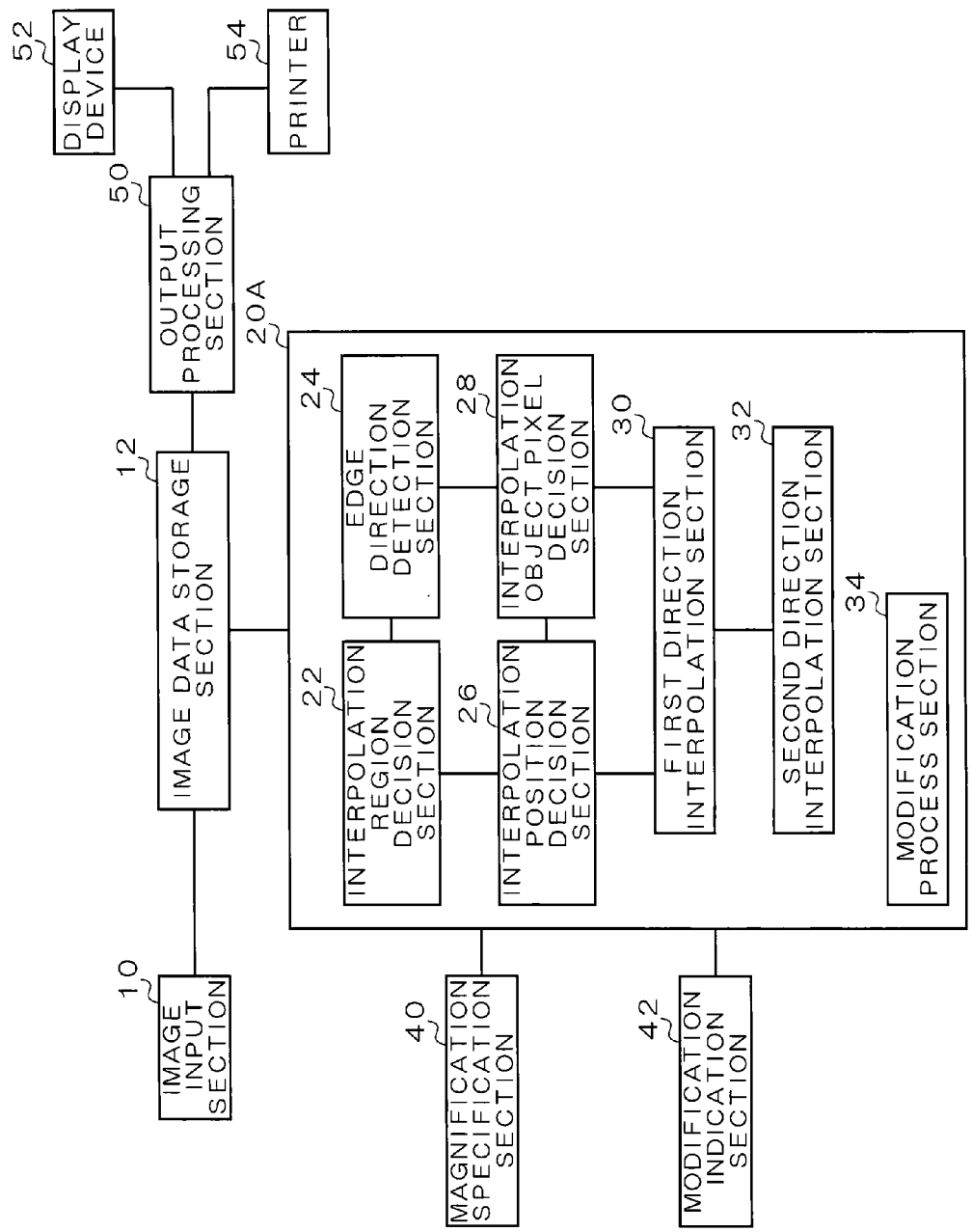
FIG. 19 is a diagram showing an overview of an image processing device according to a third embodiment.

FIG. 19 is a diagram showing the configuration of an image processing device according to a third embodiment. As shown in FIG. 19, the image processing device according to this embodiment includes the image input section 10, the image data storage section 12, an interpolation process section 20A, the magnification specification section 40, a modification indication section 42, the output processing section 50, the display device 52, and the printer 54. The image processing device according to this embodiment is different from the image processing device shown in FIG. 1 in that the interpolation process section 20 is replaced with the interpolation process section 20A and the modification indication section 42 is added. These differences are mainly explained below.

The interpolation process section 20A performs an interpolation process necessary for expansion or reduction of an image on the basis of image data and intermediate data captured by the image input section 10 and stored in the image data storage section 12. When the image after the expansion or the reduction is displayed, the interpolation process section 20A performs a partial modification process for the image according to an indication of a user. The interpolation process section 20A includes the interpolation region decision section 22, the edge direction detection section 24, the interpolation position decision section 26, the interpolation object pixel decision section 28, the first direction interpolation section 30, the second direction interpolation section 32, and a modification process section 34. The interpolation process section 20A is different from the interpolation process section 20 shown in FIG. 1 in that the modification process section 34 is added.

When applying modification to a displayed image, the modification indication section 42 is used by user to instruct the execution of the modification and used to designate a modification location and a modification direction in the displayed image. For example, the user can indicate modification of the image by pointing a predetermined location on an image display screen displayed on the display device 52 and can designate the location to be modified by partially tracing the displayed image using a pointing device such as a mouse or a stylus pen as the modification indication section 42.

The output processing section 50 and the display device 52 correspond to the display unit, the modification indication section 42 corresponds to the modification indication unit, the interpolation position decision section 26, the interpolation object pixel decision section 28, the first direction interpolation section 30, and the second direction interpolation section 32 correspond to the first and second interpolation process unit, the image input section 10 corresponds to the image input unit, the edge direction detection section 24 corresponds to the edge direction detection unit, the magnification specification section 40 corresponds to the magnification specification unit, the interpolation position decision section 26 corresponds to the first and second interpolation position decision units, and the interpolation object pixel decision section 28 corresponds to the first and second interpolation object pixel decision unit. The operation performed by the output processing section 50 and the display device 52 corresponds to the displaying step, the operation performed by the modification indication section 42 corresponds to the modification indicating step, the operation performed by the interpolation position decision section 26, the interpolation object pixel decision section 28, the first direction interpolation section 30, and the second direction interpolation section 32 corresponds to the first and second interpolation process steps, the operation performed by the image input section 10 corresponds to the image inputting step, the operation performed by the edge direction detection section 24 corresponds to the edge direction detecting step, the operation performed by the magnification specification section 40 corresponds to the magnification specifying step, the operation performed by the interpolation position decision section 26 corresponds to the first and second interpolation position deciding steps, and the operation performed by the interpolation object pixel decision unit 28 corresponds to the first and second interpolation object deciding step.

Figure 20:
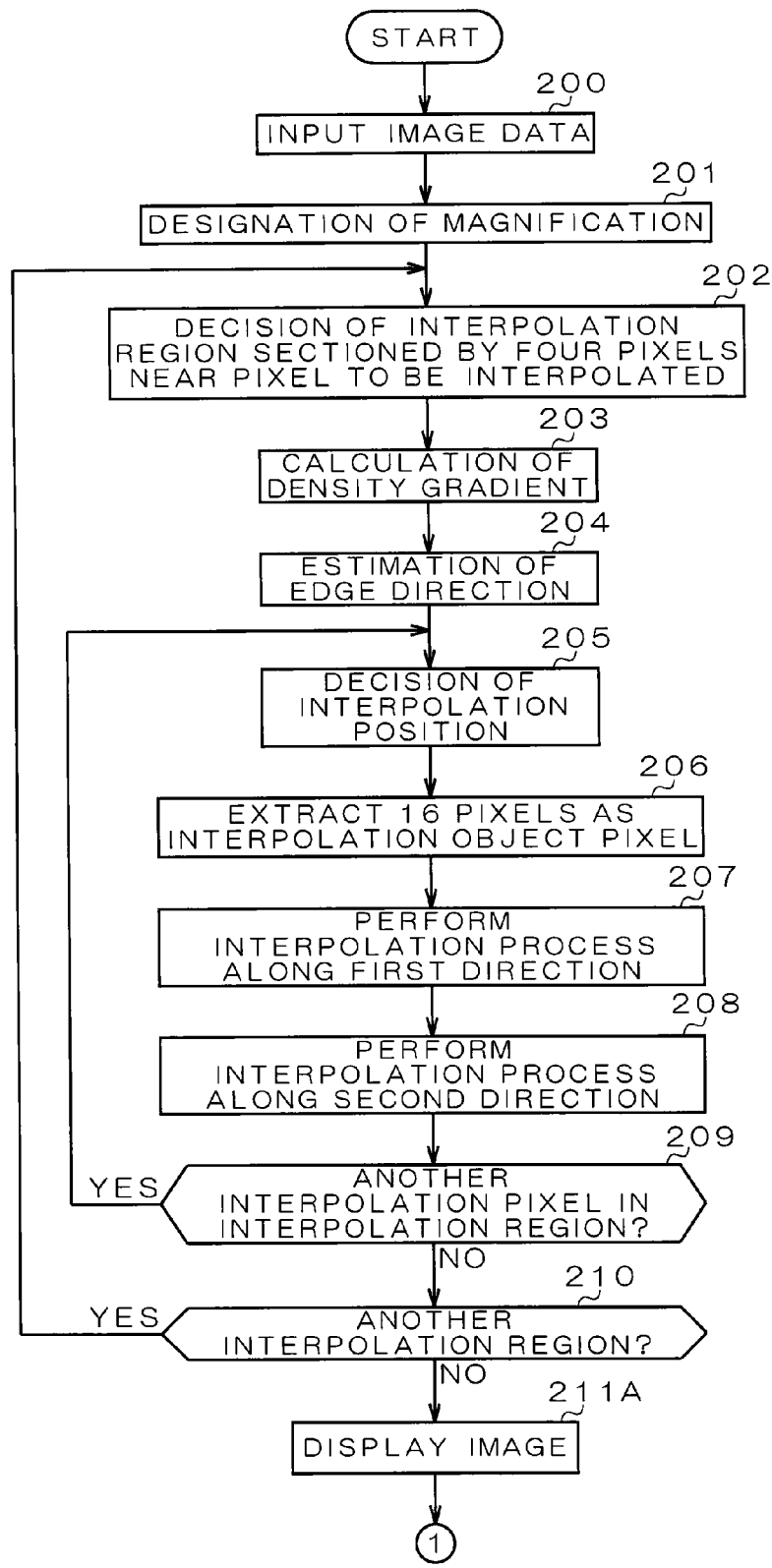
FIG. 20 is a flowchart showing an operation procedure of interpolation process by the image processing device according to the third embodiment.
Figure 21:
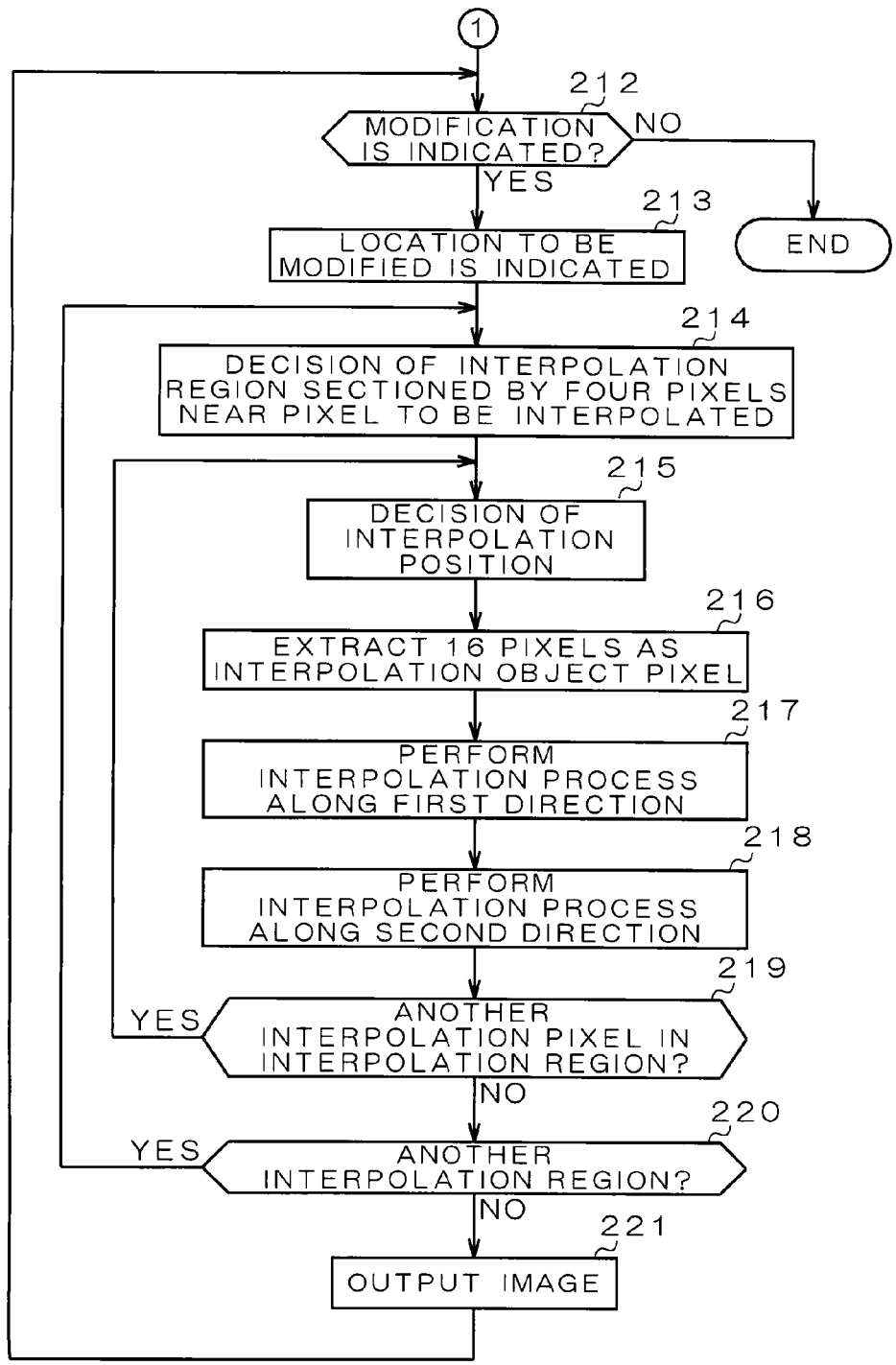
FIG. 21 is a flowchart showing the operation procedure of the interpolation process by the image processing device according to the third embodiment.

The image processing device according to this embodiment has such a configuration. Next, specific content of an interpolation process by the image processing device is explained. FIGS. 20 and 21 are flowcharts showing an operation procedure of the interpolation process by the image processing device according to this embodiment. The operation procedure shown in these figures is the same as the operation procedure shown in FIG. 2 in relation to the first embodiment in an operation procedure in steps 200 to 210 and is different from the operation procedure shown in FIG. 2 in an operation procedure in step 211A and subsequent steps. Explanation concerning the same operation procedure is omitted and the different operation procedure is explained below.

After image data for which the interpolation process ends for all interpolation regions according to the operation procedure up to step 210 is stored in the image data storage section 12, the output processing section 50 reads out this image data and displays an image after being expanded at predetermined magnification (e.g., five times) on the screen of the display device 52 (step 211A).

In the image processing device according to this embodiment, as shown in FIG. 12, even if modification of the image is not performed, in principle, an image without occurrence of jaggy along an edge direction should be obtained. However, depending on, for example, a state of a pixel value (a state of light and shade) near an edge of the image, it is likely that edge detection cannot always be accurately performed and occurrence of jaggy cannot be surely eliminated. In this embodiment, in such a case, a user visually checks a displayed image after being expanded/reduced and performs a modification indication when necessary.

Next, the modification process section 34 decides whether modification of the displayed image is indicated (step 212). When a modification indication is not performed by the user using the modification indication section 42, negative decision is made and a series of image process operation ends.

When the modification indication by the user is performed, affirmative decision is performed in the decision in step 212 and a series of image modification process explained below is carried out according to an indication of the modification process section 34.

First, an indication of a modification location of the image is performed by the user using the modification indication section 42 (step 213). This indication of the modification location includes the location of the part to be modified and a direction of an edge contained therein.

Figure 22:
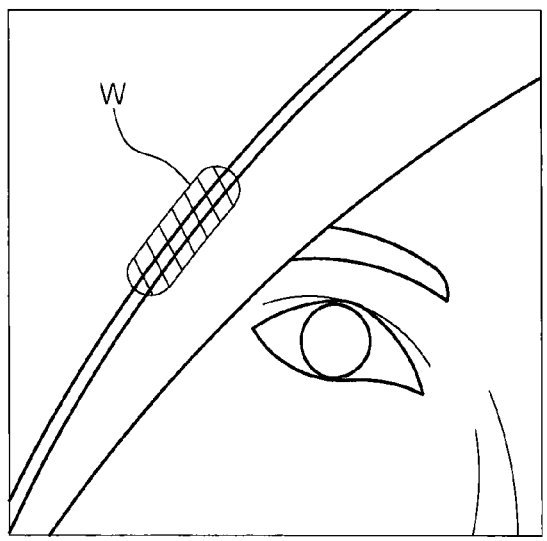
FIG. 22 is a diagram showing an overview of modification location indication.
Figure 23:
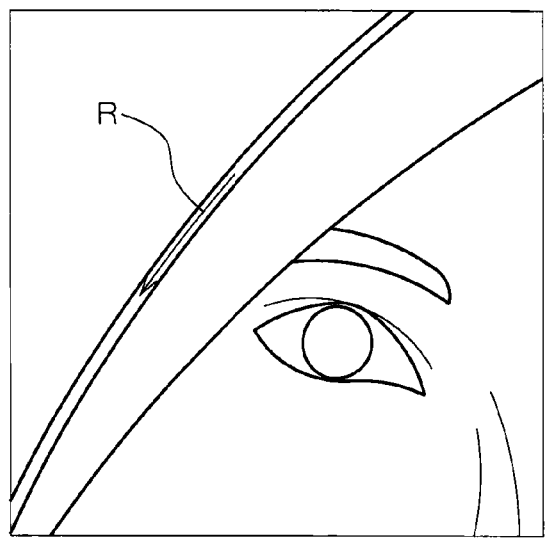
FIG. 23 is a diagram showing an overview of the modification location indication.

FIGS. 22 and 23 are diagrams showing an overview of the modification location indication. As shown in FIG. 22, it is assumed that occurrence of conspicuous jaggy is confirmed in a region W in the image displayed in step 211. As shown in FIG. 23, the user can indicate the location of the part to be modified and the direction of the edge contained therein (a modification direction) by operating the modification indication section 42 to trace an edge where the jaggy occurs in the region W. For example, when a mouse is used as the modification indication section 42, the user can indicate the position of the modification location and the direction of the edge contained in the modification location by depressing a button of the mouse at the start point of an arrow R, moving the mouse in the direction of the arrow R while maintaining that state, and releasing the depression of the button of the mouse at the end point of the arrow. Concerning setting of the width of the region W, for example, a method of setting the width of the region W such that width equivalent to a predetermined number of pixels is included on both sides of the arrow R and a method of inputting in advance a value for designating width and setting the width of the region W to be this designated width are conceivable.

Next, the interpolation region decision section 22 extracts 2×2 pixels (four pixels) out of plural pixels forming an image (a partial image) contained in the region W designated as the modification location and decides, as an "interpolation region" for modification, a region (square) sectioned by these four pixels (step 214). This operation itself is the same as the operation in step 202. However, the operation is different in that, whereas the four pixels contained in the entire region of the input image is extracted in step 202, the four pixels corresponding to the image contained in the region W are extracted in step 214. In step 214, four pixels contained in the input image before expansion/reduction corresponding to the region W are extracted rather than four pixels contained in the image after expansion/reduction displayed in step 211. Similarly, concerning modification process, pixel values of pixels contained in the input image before expansion/reduction corresponding to the region W are used.

Next, the interpolation position decision section 26 decides an interpolation position in the interpolation region, i.e., a position where an interpolation pixel is generated in the interpolation region (step 215). The interpolation object pixel decision section 28 extracts, on the basis of the direction of the edge indicated in step 213, n×n pixels necessary for calculating a pixel value of the interpolation pixel as "interpolation object pixels" (step 216). For example, 4×4 pixels are extracted in the same manner as step 206.

Figure 24:
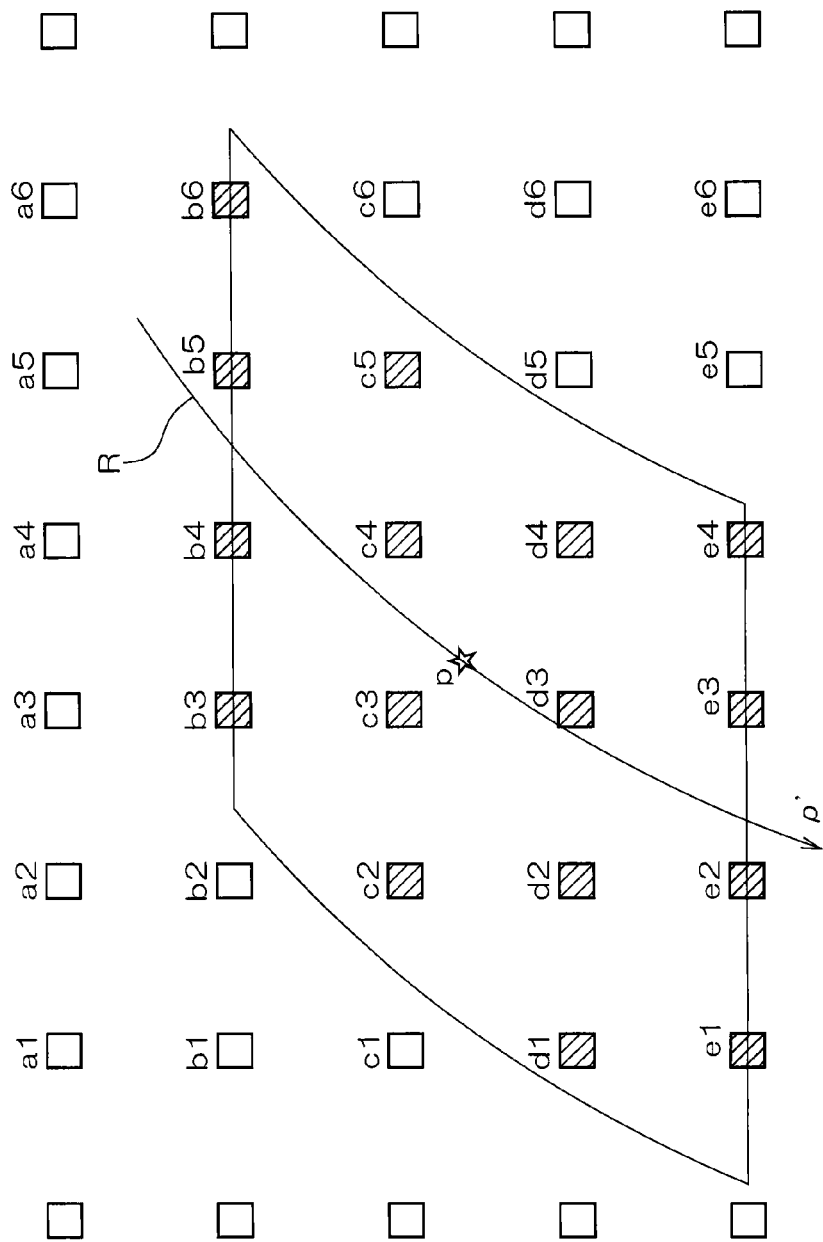
FIG. 24 is a diagram showing an overview of extraction of interpolation object pixels as objects of image modification.

FIG. 24 is a diagram showing an overview of the extraction of interpolation object pixels as objects of image modification. In FIG. 24, R is the arrow R itself shown in FIG. 23 and indicates the direction of the edge designated in step 213. The direction R of the edge passing the interpolation pixel p is set as a ρ' axis. This ρ' axis is used instead of the y axis. The x axis and the ρ' axis are respective set as interpolation axes (the ρ' axis corresponds to the third interpolation axis and the x axis corresponds to the first interpolation axis). Each two pixels in left, right, and oblique directions across the interpolation pixel p are extracted as interpolation object pixels along each of these non-orthogonal two interpolation axes. Specifically, the interpolation object pixel decision section 28 extracts sixteen pixels b3 to b6, c2 to c5, d1 to d4, and e1 to e4 as interpolation object pixels. In FIGS. 5 and 24, an example in which the same sixteen pixels are extracted is shown. However, in general, the directions E and R of the edges in these figures do not always coincide with each other. Therefore, extraction of sixteen pixels is performed such that the pixels are partially different.

Next, the first direction interpolation section 30 sets the ρ' axis as a first direction and performs an interpolation process along the first direction (step 217). The second direction interpolation section 32 sets the x axis as a second direction and performs an interpolation process along the second direction (step 218). Consequently, a pixel value of the interpolation pixel p after modification is calculated by the interpolation processes.

Next, the interpolation position decision section 26 decides whether another interpolation pixel (an interpolation pixel for which calculation of an interpolation value does not end) is present in the interpolation region (step 219). Affirmative decision is made when another interpolation pixel is present. The process returns to step 215 and the operation for determining an interpolation position and subsequent operation are repeated. When the calculation of an interpolation value ends for all interpolation pixels in the interpolation region, negative decision is made in the decision in step 219. Next, the interpolation region decision section 22 decides whether another interpolation region for which the interpolation process does not end is present (step 220). Affirmative decision is made when another interpolation region is present. The process returns to step 214 and the operation for determining an interpolation region and subsequent operation are repeated. When the interpolation process ends for all interpolation regions contained in the region W, negative decision is made in the decision in step 220.

After the image data for which the interpolation process ends for the interpolation region corresponding to the region W indicated to be modified is stored in the image data storage section 12 in this way, for example, after pixels values of pixels after the modification process are written over pixel values of pixels before the modification process in the same positions, the output processing section 50 reads out this image data and displays an image after being expanded at predetermined magnification (e.g., five times) on the screen of the display device 52 (step 221).

As explained above, in the image processing device according to this embodiment, it is possible to apply the interpolation process to the modification location according to the modification direction and perform modification of the image simply by indicating the modification location and the modification direction contained in the displayed image. Therefore, it is possible to reduce time required for modification of the image. By performing the interpolation process along the modification direction, it is possible to directly reflect the influence of pixels present along the modification direction with respect to the interpolation position, perform highly accurate interpolation process, and improve accuracy of the modification.

By detecting a direction of an edge contained in an image and performing the interpolation process according to the direction, it is possible to perform the interpolation process directly reflecting the influence of pixels present in the direction of the edge with respect to the interpolation position. It is possible to prevent degradation of an image quality which occurs when modifying the magnification of the image. Further, by setting such an image as a modification object, it is possible to reduce the number of modification locations and further reduce time and labor required for modification of the image.

In particular, by detecting a direction of an edge on the basis of pixel values of four pixels surrounding the interpolation position, it is possible to reduce the number of pixels necessary for the edge direction detection and reduce an operation amount. When an edge is present, since a shading gradient occurs across the edge, it is possible to surely learn a direction of the edge by using the shading gradient. By performing modification of the image using pixel values of pixels forming the input image, it is possible to eliminate the influence of degradation of the image quality due to the interpolation process performed for image display.

By reflecting pixel values of the pixels arranged along the direction of the modification direction on the interpolation process for calculating a pixel value of the interpolation position, it is possible to obtain an image smooth along the modification direction and without occurrence of jaggy.

As explained in the first embodiment as well, although the interpolation process in the first direction in step 207 (FIG. 9) is performed along the ρ axis and the interpolation process in the second direction in step 208 (FIG. 11) is performed along the x axis, conversely, the interpolation process in the first direction may be performed along the x axis and the interpolation process in the second direction may be performed in the ρ axis. This modification can also be applied to the interpolation process in the first direction performed in step 217 and the second interpolation process performed in step 218.

Fourth Embodiment

In the third embodiment, the interpolation process along the edge direction is performed to create and display an expanded/reduced image (steps 202 to 211A) and the modification process is applied to the region W where occurrence of jaggy is visually checked in this displayed image. However, an image displayed for checking a modification location may be created by various interpolation processes conventionally performed rather than the interpolation process along the edge direction.

Figure 25:
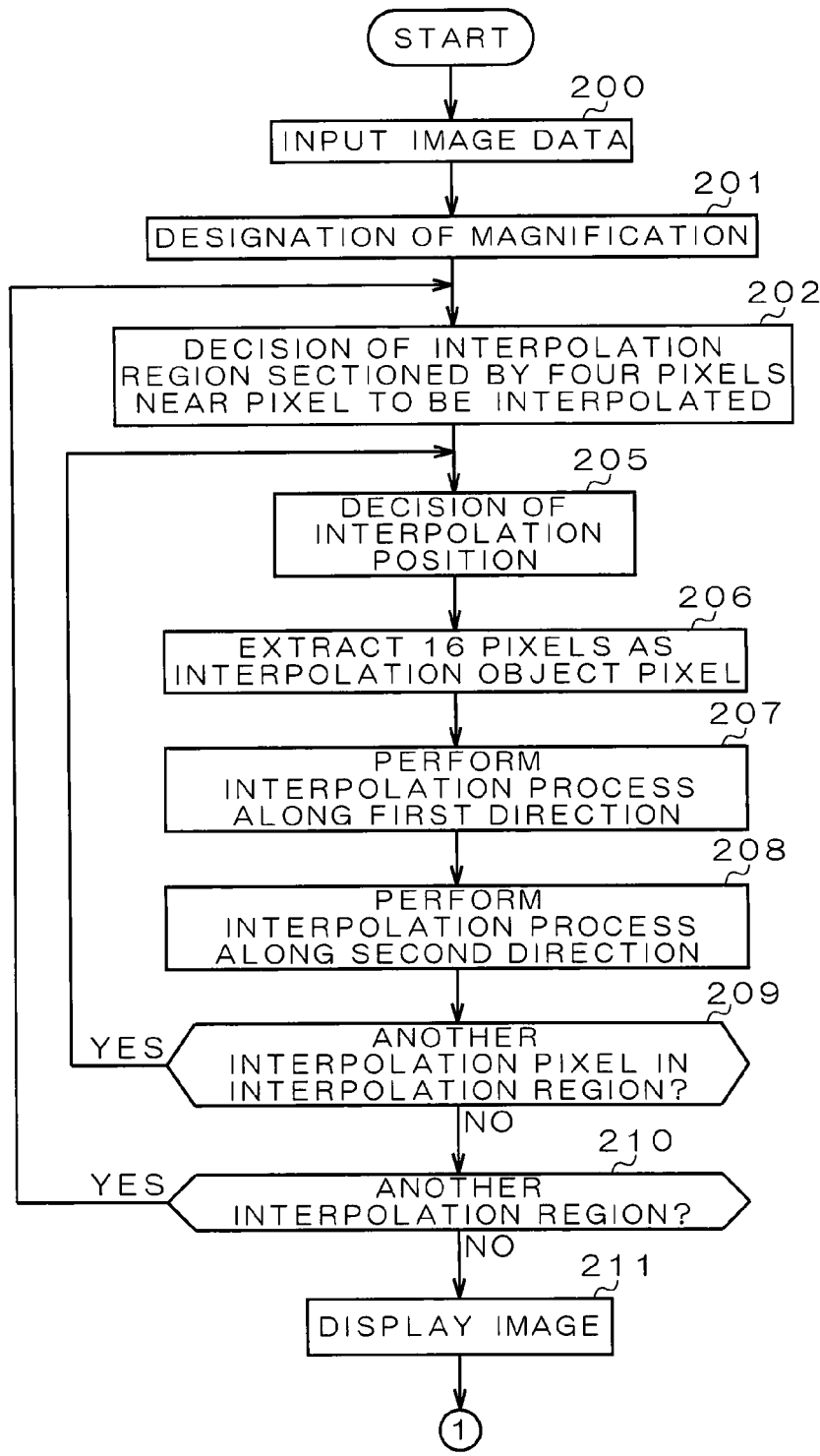
FIG. 25 is a flowchart showing an operation procedure according to a fourth embodiment.
Figure 26:
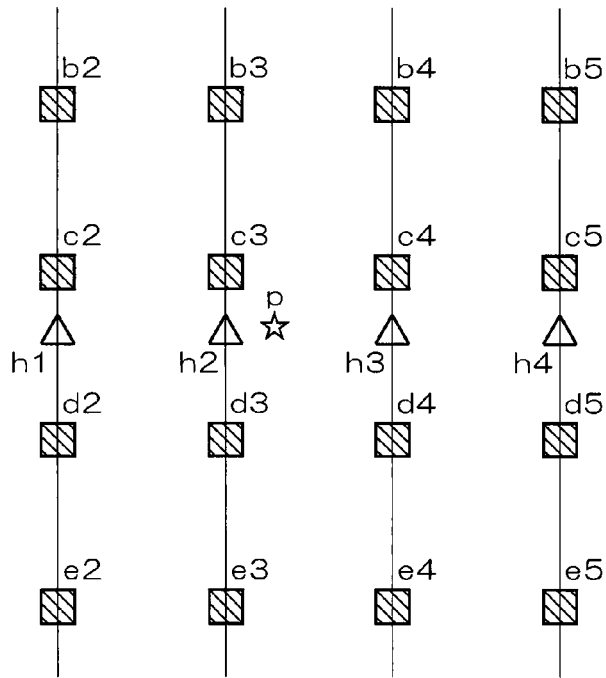
FIG. 26 is an explanatory diagram of interpolation process by a method in the past.
Figure 27:
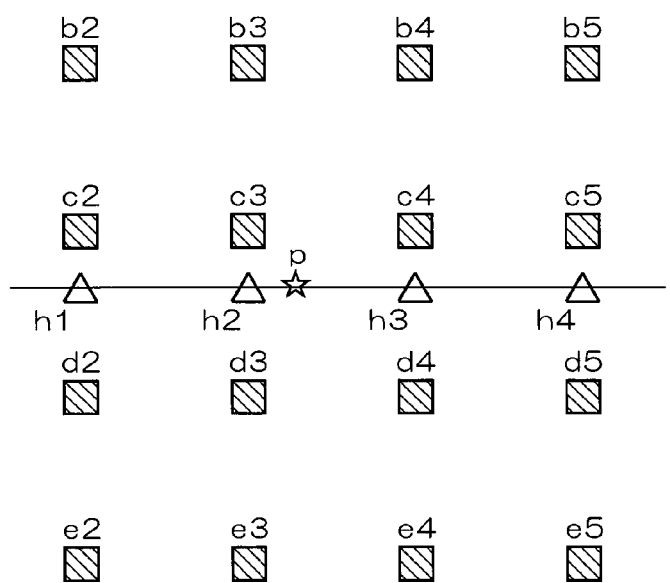
FIG. 27 is an explanatory diagram of the interpolation process by the method in the past.

FIG. 25 is a flowchart showing an operation procedure according to a fourth embodiment. In this flowchart, compared with the flowchart shown in FIG. 20, the operations of the density gradient calculation in step 203 and the edge direction estimation in step 204 are omitted. Specifically, as shown in FIG. 26, the interpolation object pixel decision section 28 extracts, as interpolation object pixels, sixteen pixels in total, each two pixels of which are arranged above and below and on the left and right surrounding an interpolation position (step 206). The first direction interpolation section 30 calculates, by using pixel values of four pixels arranged along the y axis, pixel values of imaginary interpolation pixels h1 to h4 corresponding to a position along the y axis same as the interpolation pixel p according to an interpolation process (step 207). Next, as shown in FIG. 27, the second direction interpolation section 32 calculates, by using the pixel values of the imaginary interpolation pixels h1 to h4 arranged along the x axis direction, a pixel value of the final interpolation pixel p before a modification process according to the interpolation process (step 208). After the image expanded in this way is displayed (step 211), the series of image modification processes shown in FIG. 21 is carried out.

The present invention is not limited to the embodiments. Various modified implementations are possible within the gist of the present invention. For example, in the embodiments, the case in which the input image is expanded to perform display or the like is explained. However, since the operation principle itself is not only for expansion of an image and is the same for reduction of the image. Therefore, it is possible to apply the present invention to the reduction of an image as well and prevent degradation of an image quality.

In the embodiments, the density gradient and the edge direction of the image is calculated on the basis of the pixel values of the four pixels surrounding the interpolation position. However, the density gradient and the edge direction may be calculated by using pixel values of a larger number of pixels (e.g., sixteen pixels).

In the third embodiment, as explained with reference to FIG. 24, the interpolation object pixel decision section 28 extracts the n×n pixels in order to calculate pixel values of the interpolation pixel on the basis of the modification direction (the direction of the edge). However, it is necessary to represent the modification direction with some function in order to perform this extraction process. Most simply, it is conceivable to linearly approximate a shape of the arrow R shown in FIG. 24. It is possible to simplify the interpolation process by simplifying a shape indicating the modification direction in this way. Alternatively, it is conceivable to approximate the shape of the arrow R with an arcuate shape or a free curve shape. In this case, it is possible to accurately specify a moving locus of a pointing device such as a mouse, designate a direction of an edge of an image contained in a modification location as a modification direction, perform modification accurately along the direction of the edge, and improve accuracy of the modification.

INDUSTRIAL APPLICABILITY

According to the present invention, by detecting a direction of an edge contained in an image and performing an interpolation process according to the direction, it is possible to perform an interpolation process directly reflecting the influence of pixels present in the direction of the edge with respect to an interpolation position and prevent degradation of an image quality which occurs when modifying the magnification of the image.

The invention claimed is:

1. An image processing device comprising:
an image input unit which performs input of an image;
an edge direction detection unit which detects a direction of an edge of light and shade contained in the image inputted by the image input unit;
a first interpolation process unit which sets, as a first interpolation axis, a direction of the edge detected by the edge direction detection unit with respect to the input image inputted by the image input unit and performs an interpolation process for performing expansion/reduction of the input image along the first interpolation axis; and
a magnification specification unit which designates magnification of expansion/reduction for the image inputted by the image input unit, wherein
the first interpolation process unit includes:
a first interpolation position decision unit which decides an interpolation position corresponding to the magnification designated by the magnification designation unit; and
a first interpolation object pixel decision unit which extracts, as interpolation object pixels, n×n (n is an even number equal to or larger than four) pixels arranged around the interpolation position and along the direction of the edge detected by the edge direction detection unit,
the first interpolation object pixel decision unit sets the first interpolation axis having the direction of the edge detected by the edge direction detection unit,
one of the horizontal axis and the vertical axis is used as a second interpolation axis, and the first interpolation process unit calculates pixel values in imaginary plural interpolation positions by performing the interpolation process along one interpolation axis of the first and second interpolation axes and calculates, using pixel values corresponding to n interpolation positions obtained by the interpolation process, an interpolation value corresponding to the interpolation position, which is decided by the first interpolation position decision unit, along the other interpolation axis of the first and second interpolation axis,
wherein the interpolation process by the first interpolation process unit is performed by using a sampling function φ(t) represented by $$\phi(t) = -1.75|t|^2 + 1.0 \ (|t| \leq 0.5)$$

$$1.25|t|^2 - 3.0|t| + 1.75 \ (0.5 < |t| \leq 1.0)$$

$$0.75|t|^2 - 2.0|t| + 1.25 \ (1.0 < |t| \leq 1.5)$$

$$-0.25|t|^2 + |t| - 1.0 \ (1.5 < |t| \leq 2.0)$$

$$0 \ (2.0 < |t|)$$

where t represents an interval of adjacent pixels.

2. The image processing device according to claim 1, wherein the edge direction detection unit detects a direction indicated by using a pointing device on an input image and sets the direction as the direction of the edge.

3. The image processing device according to claim 1, wherein the image inputted by the image input unit includes plural pixels arranged along the horizontal axis and the vertical axis orthogonal to each other, and
the edge direction detection unit detects the direction of the edge on the basis of pixel values of four pixels surrounding the interpolation position.

4. The image processing device according to claim 3, wherein the edge direction detection unit calculates, on the basis of the pixel values of the four pixels surrounding the interpolation position, a density gradient of an image corresponding to the four pixels and estimates a direction perpendicular to the density gradient as the direction of taahe edge.

5. The image processing device according to claim 1, wherein the first interpolation axis has a linear shape which coincides with the direction of the edge.

6. The image processing device according to claim 1, wherein the first interpolation axis has a nonlinear shape set in contact with a straight line which coincides with the direction of the edge in the interpolation position.

7. The image processing device according to claim 1, wherein the first interpolation object pixel decision unit decides on the basis of the direction of the edge detected by the edge detection unit which of the horizontal axis and the vertical axis is used as the second interpolation axis.

8. The image processing device according to claim 7, wherein the first interpolation object pixel decision unit sets, as the second interpolation axis, the horizontal axis or the vertical axis having an angle equal to or larger than 45 degrees with respect to the first interpolation axis.

9. The image processing device according to claim 1, wherein the first interpolation process unit performs the interpolation process after adjusting the pixel positions of the n×n pixels along the second interpolation axis such that the pixels are arranged in a lattice pattern along the first and second interpolation axes.

10. The image processing device according to claim 1, further comprising:
- a display unit which displays, as an image set as a modification object, the image obtained by the interpolation process by the first interpolation process unit;
- a modification indication unit which indicates, together with a modification direction, a modification location contained in the image displayed by the display unit; and
- a second interpolation process unit which performs interpolation process along the modification direction indicated by the modification indication unit to a partial image corresponding to the modification location indicated by the modification indication unit.

11. The image processing device according to claim 10, wherein the second interpolation process unit performs the interpolation process corresponding to the partial image using pixel values of the pixels forming the image inputted by the image input unit.

12. The image processing device according to claim 10, wherein the second interpolation process unit includes a second interpolation object pixel decision unit which extracts, as interpolation object pixels, a predetermined number of pixels arranged around the interpolation position and along the modification direction indicated by the modification indication unit.

13. The image processing device according to claim 10, wherein the interpolation process by the second interpolation process unit is performed by using a sampling function $\phi(t)$ represented by $$\phi(t)=-1.75|t|^2+1.0 \ (|t|\leq 0.5)$$

$$1.25|t|^2 3.0|t|+1.75 \ (0.5<|t|\leq 1.0)$$

$$0.75|t|^2-2.0|t|+1.25 \ (1.0<|t|\leq 1.5)$$

$$0.25|t|^2+|t|-1.0 \ (1.5<|t|\leq 2.0)$$

$$0 \ (2.0<|t|)$$

where t represents an interval of adjacent pixels.

14. An image processing method comprising:
- an image inputting step of performing input of an image;
- an edge direction detecting step of detecting a direction of an edge of light and shade contained in the image input in the image inputting step;
- a first interpolation process step of setting, as a first interpolation axis, a direction of the edge detected in the edge direction detecting step with respect to the input image input in the image inputting step and performing an interpolation process for performing expansion/reduction of the input image along the first interpolation axis; and
- a magnification specifying step of designating magnification of expansion/reduction for the image input in the image inputting step, wherein the first interpolation process step includes:
- a first interpolation position deciding step of deciding an interpolation position corresponding to the magnification designated in the magnification specifying step; and
- a first interpolation object pixel deciding step of extracting, as interpolation object pixels, n×n (n is an even number equal to or larger than four) pixels arranged around the interpolation position and along the direction of the edge detected in the edge direction detecting step, in the first interpolation object pixel deciding step, the first interpolation axis having the direction of the edge detected in the edge direction detecting step is set, one of the horizontal axis and the vertical axis is used as a second interpolation axis, and in the first interpolation process step, pixel values in imaginary plural interpolation positions are calculated by performing the interpolation process along one interpolation axis of the first and second interpolation axes and an interpolation value corresponding to the interpolation position, which is decided in the first interpolation position deciding step, is calculated along the other interpolation axis of the first and second interpolation axis by using pixel values corresponding to n interpolation positions obtained by the interpolation process, wherein the interpolation process by the first interpolation process unit is performed by using a sampling function $\phi(t)$ represented by $$\phi(t)=-1.75|t|^2+1.0 \ (|t|\leq 0.5)$$

$$1.25|t|^2 3.0|t|+1.75 \ (0.5<|t|\leq 1.0)$$

$$0.75|t|^2-2.0|t|+1.25 \ (1.0<|t|\leq 1.5)$$

$$0.25|t|^2+|t|-1.0 \ (1.5<|t|\leq 2.0)$$

$$0 \ (2.0<|t|)$$

where t represents an interval of adjacent pixels.

15. A non-transitory recording medium readable by a computer, which is recorded with a computer-executable image processing program for causing a computer to function as:
- an image input unit which performs input of an image;
- an edge direction detection unit which detects a direction of an edge of light and shade contained in the image inputted by the image input unit;
- a first interpolation process unit which sets, as a first interpolation axis, a direction of the edge detected by the edge direction detection unit with respect to the input image inputted by the image input unit and performs an interpolation process for performing expansion/reduction of the input image along the first interpolation axis; and
- a magnification specification unit which designates magnification of expansion/reduction for the image inputted by the image input unit, wherein the first interpolation process unit includes:
- a first interpolation position decision unit which decides an interpolation position corresponding to the magnification designated by the magnification specification unit; and
- a first interpolation object pixel decision unit which extracts, as interpolation object pixels, n×n (n is an even number equal to or larger than four) pixels arranged around the interpolation position and along the direction of the edge detected by the edge direction detection unit, the first interpolation object pixel decision unit sets the first interpolation axis having the direction of the edge detected by the edge direction detection unit, one of the horizontal axis and the vertical axis is used as a second interpolation axis, and the first interpolation process unit calculates pixel values in imaginary plural interpolation positions by performing the interpolation process along one interpolation axis of the first and second interpolation axes and calculates, using pixel values corresponding to n interpolation positions obtained by the interpolation process, an interpolation value corresponding to the interpolation position, which is decided by the first interpolation position decision unit, along the other interpolation axis of the first and second interpolation axis,
wherein the interpolation process by the first interpolation process unit is performed by using a sampling function φ(t) represented by $\phi(t) = -1.75|t|^2 + 1.0 \ (|t| \leq 0.5)$ $1.25|t|^2 3.0|t| + 1.75 \ (0.5 < |t| \leq 1.0)$ $0.75|t|^2 - 2.0|t| + 1.25 \ (1.0 < |t| \leq 1.5)$ $0.25|t|^2 + |t| - 1.0 \ (1.5 < |t| \leq 2.0)$ $0 \ (2.0 < |t|)$ where t represents an interval of adjacent pixels.

* * * * *